US011543698B2

(12) United States Patent
Sasaki et al.

(10) Patent No.: US 11,543,698 B2
(45) Date of Patent: Jan. 3, 2023

(54) LIQUID CRYSTAL DISPLAY DEVICE

(71) Applicant: SHARP KABUSHIKI KAISHA, Sakai (JP)

(72) Inventors: Takahiro Sasaki, Sakai (JP); Ming Ni, Sakai (JP); Takashi Satoh, Sakai (JP); Keiichi Ina, Sakai (JP); Shuji Nishi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 19 days.

(21) Appl. No.: 17/118,340

(22) Filed: Dec. 10, 2020

(65) Prior Publication Data

US 2021/0181576 A1 Jun. 17, 2021

(30) Foreign Application Priority Data

Dec. 13, 2019 (JP) .............................. JP2019-225483
Sep. 17, 2020 (JP) .............................. JP2020-156311

(51) Int. Cl.
*G02F 1/1335* (2006.01)
*G09G 3/36* (2006.01)

(52) U.S. Cl.
CPC .. *G02F 1/133553* (2013.01); *G02F 1/133514* (2013.01); *G09G 3/3696* (2013.01)

(58) Field of Classification Search
CPC ........ G02F 1/133553; G02F 1/133514; G09G 3/3696
USPC ........................................................ 349/56
See application file for complete search history.

(56) References Cited

U.S. PATENT DOCUMENTS

| 8,692,758 | B2 | 4/2014 | Matsuda et al. |
| 2010/0295841 | A1 | 11/2010 | Matsuda et al. |
| 2012/0224132 | A1* | 9/2012 | Hayama ............ G02F 1/133723 349/153 |
| 2013/0320334 | A1 | 12/2013 | Yamazaki et al. |
| 2017/0285386 | A1* | 10/2017 | Ono ..................... G02F 1/13394 |

FOREIGN PATENT DOCUMENTS

| JP | 2000-122094 A | 4/2000 |
| JP | 3394926 B2 | 4/2003 |
| JP | 2003-131268 A | 5/2003 |
| JP | 3469663 B2 | 11/2003 |
| JP | 5036864 B2 | 9/2012 |
| JP | 2014-007399 A | 1/2014 |

* cited by examiner

*Primary Examiner* — Nathanael R Briggs
*Assistant Examiner* — William D Peterson
(74) *Attorney, Agent, or Firm* — ScienBiziP, P.C.

(57) ABSTRACT

A liquid crystal display device includes a first substrate, a second substrate, a liquid crystal layer, and a plurality of pixels. Each of the pixels has a reflection region for performing display in a reflective mode. The first substrate includes a pixel electrode provided in each of the pixels and a reflection layer positioned opposite to the liquid crystal layer with respect to the pixel electrode. The reflection layer has a first region positioned in each of the pixels and a second region positioned between any two pixels adjacent to each other. Voltages of an identical polarity are applied to the liquid crystal layer for any two pixels adjacent to each other in a row direction, for any two pixels adjacent to each other in a column direction, or for all the pixels.

14 Claims, 29 Drawing Sheets

BLACK DISPLAY　　DARK GRAY-LEVEL DISPLAY　　BRIGHT GRAY-LEVEL DISPLAY　　WHITE DISPLAY

LIQUID CRYSTAL DISPLAY DEVICE

BACKGROUND

1. Field

The present disclosure relates to a liquid crystal display device and particularly relates to a liquid crystal display device in which each pixel has a reflection region.

2. Description of the Related Art

In general, liquid crystal display devices are broadly divided into transmission type liquid crystal display devices and reflection type liquid crystal display devices. A transmission type liquid crystal display device performs display in a transmissive mode by using light output from a backlight. A reflection type liquid crystal display device performs display in a reflective mode by using ambient light. Further, liquid crystal display devices in which each pixel has a reflection region for performing display in the reflective mode and a transmission region for performing display in the transmissive mode have been proposed. Such liquid crystal display devices are called transflective type or trans-mission-reflection type liquid crystal display devices.

Reflection type and transflective type liquid crystal display devices are suitably used as, for example, small- and medium-sized display devices that are used outdoors for mobile use. A reflection type liquid crystal display device is disclosed in, for example, Japanese Unexamined Patent Application Publication No. 2000-122094. A transflective type liquid crystal display device is disclosed in, for example, Japanese Unexamined Patent Application Publication No. 2003-131268.

In the reflection type liquid crystal display device disclosed in Japanese Unexamined Patent Application Publication No. 2000-122094, a reflective electrode provided in a TFT substrate has an uneven shape. In the transflective type liquid crystal display device disclosed in Japanese Unexamined Patent Application Publication No. 2003-131268, a reflective electrode provided in a reflection region has an uneven shape. The reflective electrode having the uneven shape causes ambient light to be diffused and reflected, thus achieving display close to paper-white display.

The reflection type and transflective type liquid crystal display devices, which correspond to liquid crystal display devices in which each pixel has a region (reflection region) for performing display in the reflective mode, are desirable to further improve light efficiency (reflectance) of display in the reflective mode (that is, to enable notably brighter display in the reflective mode).

The disclosure is made in view of the aforementioned problem, and it is desirable to increase reflectance and achieve brighter display compared with the conventional art in a liquid crystal display device in which each pixel has a reflection region for performing display in a reflective mode.

SUMMARY

According to an embodiment of the disclosure, a liquid crystal display device described below is provided.

A liquid crystal display device includes: a first substrate; a second substrate facing the first substrate; a liquid crystal layer provided between the first substrate and the second substrate; and a plurality of pixels that are arrayed in a matrix including a plurality of rows and a plurality of columns, in which each of the plurality of pixels has a reflection region for performing display in a reflective mode, the first substrate includes a pixel electrode provided in each of the plurality of pixels and a reflection layer positioned opposite to the liquid crystal layer with respect to the pixel electrode, the reflection layer has a first region positioned in each of the plurality of pixels and a second region positioned between any two pixels adjacent to each other among the plurality of pixels, and voltages of an identical polarity are applied to the liquid crystal layer for any two pixels adjacent to each other in a row direction among the plurality of pixels, for any two pixels adjacent to each other in a column direction among the plurality of pixels, or for all the plurality of pixels.

DESCRIPTION OF THE EMBODIMENTS

Embodiments of the disclosure will be described below with reference to the drawings. Note that the disclosure is not limited to the following embodiments.

Embodiment 1

Figure 1:
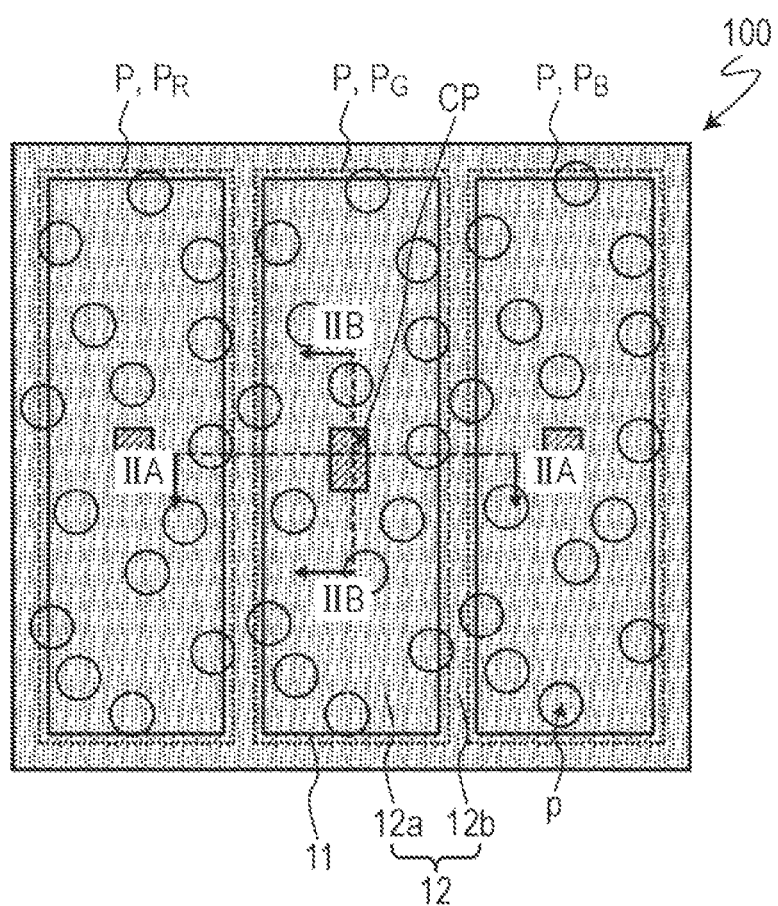
FIG. 1 is a plan view schematically illustrating a liquid crystal display device 100 according to an embodiment of the disclosure and illustrates regions corresponding to three pixels P of the liquid crystal display device 100.
Figure 2A:
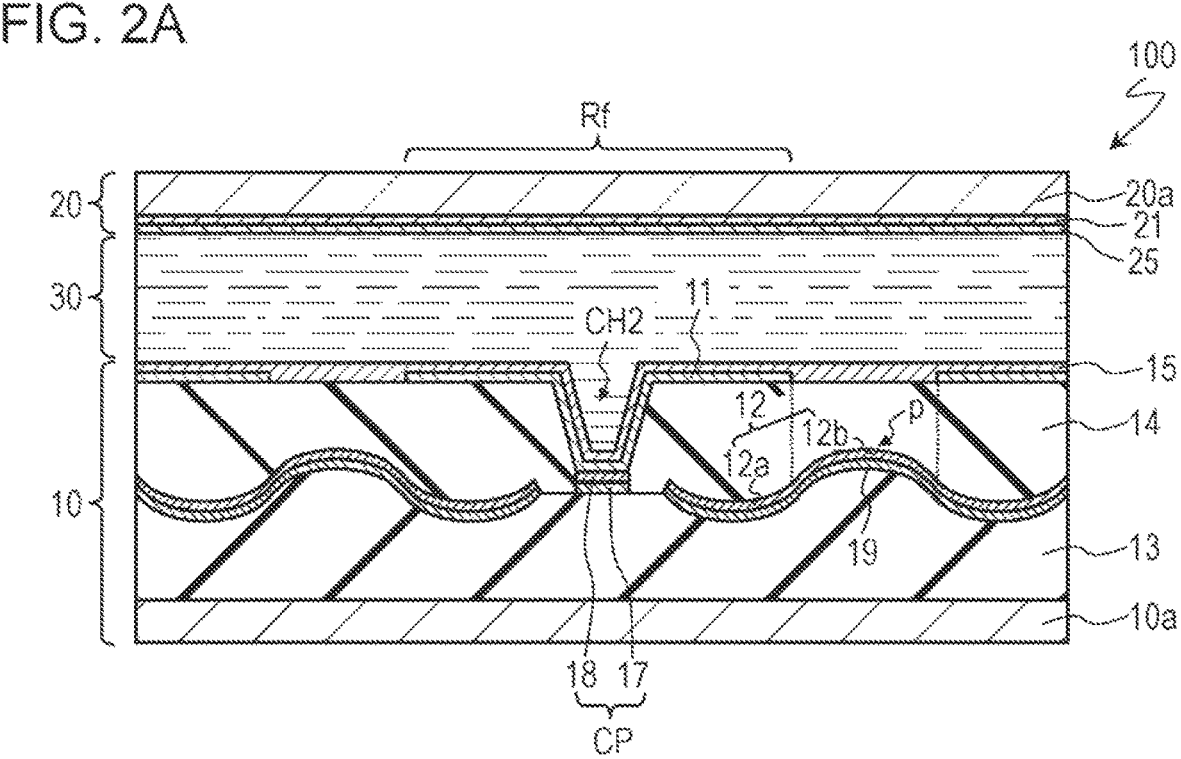
FIG. 2A is a sectional view schematically illustrating the liquid crystal display device 100 and illustrates a sectional structure along line IIA-IIA in FIG. 1.
Figure 2B:
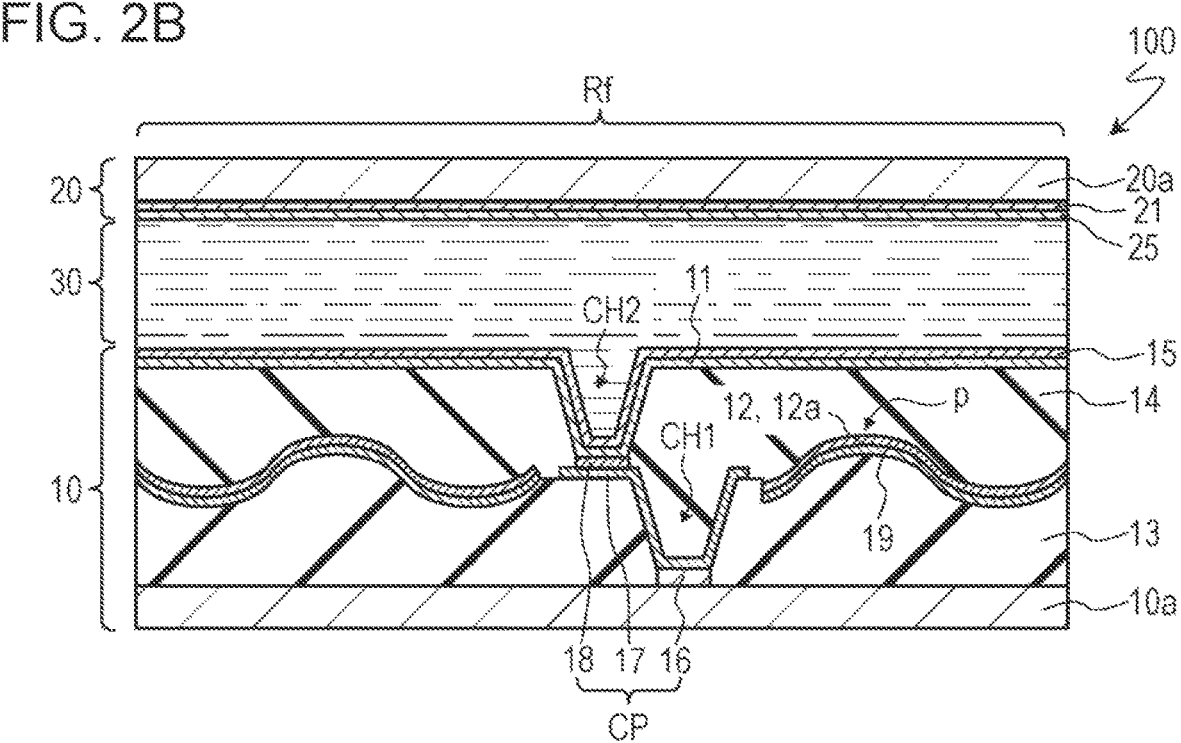
FIG. 2B is a sectional view schematically illustrating the liquid crystal display device 100 and illustrates a sectional structure along line IIB-IIB in FIG. 1.

A liquid crystal display device 100 of the present embodiment will be described with reference to FIGS. 1, 2A, and 2B. The liquid crystal display device 100 of the present embodiment is a reflection type liquid crystal display device. FIG. 1 is a plan view schematically illustrating the liquid crystal display device 100 and illustrates regions corresponding to three pixels P of the liquid crystal display device 100. FIGS. 2A and 2B are sectional views schematically illustrating the liquid crystal display device 100 and illustrate sectional structures along line IIA-IIA and line IIB-IIB in FIG. 1, respectively.

As illustrated in FIG. 1, the liquid crystal display device 100 has a plurality of pixels P. The plurality of pixels P are arrayed in a matrix including a plurality of rows and a plurality of columns. The plurality of pixels P typically include a red pixel $P_R$ for displaying red, a green pixel $P_G$ for displaying green, and a blue pixel $P_B$ for displaying blue.

As illustrated in FIG. 2, the liquid crystal display device 100 includes a TFT substrate (first substrate) 10, an opposing substrate (second substrate) 20 facing the TFT substrate 10, and a liquid crystal layer 30 provided between the TFT substrate 10 and the opposing substrate 20. Each of the pixels P has a reflection region Rf for performing display in a reflective mode and does not have a region (that is, a transmission region) for performing display in a transmissive mode.

The TFT substrate 10 includes a pixel electrode 11 provided in each of the plurality of pixels P and a reflection layer 12 positioned opposite to the liquid crystal layer 30 with respect to the pixel electrode 11 (that is, closer than the pixel electrode 11 to the rear surface side). The TFT substrate 10 further includes a first interlayer insulating layer 13, a second interlayer insulating layer 14, a contact portion CP, and a first alignment film 15.

Components (such as the pixel electrode 11 described above) of the TFT substrate 10 are supported by a substrate 10a. The substrate 10a is, for example, a glass substrate or plastic substrate.

A circuit (backplane circuit) (not illustrated) for driving the pixels P is formed on the substrate 10a. Here, the backplane circuit has a memory circuit (for example, SRAM) connected to each of the plurality of pixels P. A liquid crystal display device having memory circuits provided for the pixels P is called "a memory liquid crystal display" in some cases. A specific configuration of the memory liquid crystal display is disclosed in, for example, Japanese patent No. 5036864 (corresponding to U.S. Pat. No. 8,692,758). For reference, the entire contents of the disclosures of Japanese patent No. 5036864 and U.S. Pat. No. 8,692,758 are incorporated herein.

The first interlayer insulating layer 13 is provided so as to cover the backplane circuit. The surface of the first interlayer insulating layer 13 has an uneven shape. That is, the first interlayer insulating layer 13 has an uneven surface structure. The first interlayer insulating layer 13 having the uneven surface structure can be formed by using a photosensitive resin as described in, for example, Japanese patent No. 3394926.

The reflection layer 12 is provided on the first interlayer insulating layer 13. The reflection layer 12 is formed from a metal material having high reflectance. Although a silver alloy is used here as the metal material for forming the reflection layer 12, the metal material is not limited thereto and, for example, aluminum or an aluminum alloy may be used. The surface of the reflection layer 12 has an uneven shape conforming to the uneven surface structure of the first interlayer insulating layer 13. That is, the reflection layer 12 also has an uneven surface structure. The uneven surface structure of the reflection layer 12 is provided to achieve display close to paper-white display by diffusing and reflecting ambient light. The uneven surface structure can be formed by a plurality of projections p that are randomly arranged such that a distance between the centers of adjacent projections p is, for example, 5 µm or more and 50 µm or less, preferably 10 µm or more and 20 µm or less. The projections p have a substantially circular shape or substantially polygonal shape as viewed in the direction normal to the substrate 10a. The ratio of the area of the projections p relative to a pixel P is, for example, about 20% to 40%. The height of each of the projections p is, for example, 1 µm or more and 5 µm or less.

The second interlayer insulating layer 14 is a transparent insulating layer provided so as to cover the reflection layer 12.

The pixel electrode 11 is arranged on the second interlayer insulating layer 14. That is, the pixel electrode 11 is provided on the reflection layer 12 via the transparent insulating layer 14. The pixel electrode 11 is formed from a transparent conductive material. As the transparent conductive material, for example, indium tin oxide (ITO), indium zinc oxide (IZO (registered trademark)), or a mixture thereof is usable. The pixel electrode 11 is electrically connected to the backplane circuit that includes the memory circuit.

The contact portion CP electrically connects the pixel electrode 11 and the backplane circuit in a first contact hole CH1 formed in the first interlayer insulating layer 13 and a second contact hole CH2 formed in the second interlayer insulating layer 14. In the illustrated example, the contact portion CP is constituted by a first contact electrode 16, a second contact electrode 17, and a third contact electrode 18.

The first contact electrode 16 is an electrode (or a portion of a wire) that is exposed in the first contact hole CH1. The second contact electrode 17 is formed in the first contact hole CH1 in the first interlayer insulating layer 13 and is connected to the first contact electrode 16 in the first contact hole CH1. A portion of the second contact electrode 17 is exposed in the second contact hole CH2. The third contact electrode 18 is connected to the second contact electrode 17 and the pixel electrode 11 in the second contact hole CH2. In other words, the third contact electrode 18 is interposed between the second contact electrode 17 and the pixel electrode 11. Note that, in the illustrated example, a conductive layer 19 formed from the same conductive film as the second contact electrode 17 (i.e., formed in the same layer as the second contact electrode 17) is interposed between the reflection layer 12 and the first interlayer insulating layer 13. The third contact electrode 18 is formed from the same metal film as the reflection layer 12 (i.e., formed in the same layer as the reflection layer 12). The conductive layer 19 and the third contact electrode 18 may be omitted.

The opposing substrate 20 includes a counter electrode 21 and a second alignment film 25. The opposing substrate 20 further includes a color filter layer and a plurality of columnar spacers (neither illustrated). Components (such as the counter electrode 21 described above) of the opposing substrate 20 are supported by a substrate 20a. The substrate 20a is, for example, a glass substrate or plastic substrate. Note that the opposing substrate 20 does not have a black matrix (light-shielding layer) between any two pixels P that are adjacent to each other.

The counter electrode 21 is provided so as to face the pixel electrode 11. The counter electrode 21 is formed from a transparent conductive material. As the transparent conductive material for forming the counter electrode 21, a material similar to that of the pixel electrode 11 is usable. Here, the same potential as the potential (common potential) applied to the counter electrode 21 is applied to the reflection layer 12, and an auxiliary capacitance is formed by the pixel electrode 11, the reflection layer 12, and the second interlayer insulating layer 14 positioned therebetween.

The color filter layer typically includes a red color filter provided in a region corresponding to the red pixel $P_R$, a green color filter provided in a region corresponding to the green pixel $P_G$, and a blue color filter provided in a region corresponding to the blue pixel $P_B$. A region of the color filter layer, which corresponds to a portion between pixels P of different colors, substantially equally divides the color filters of the different colors, for example.

The columnar spacers define the dimension (cell gap) of the liquid crystal layer 30. The columnar spacers are able to be formed from a photosensitive resin.

The liquid crystal layer 30 here contains a nematic liquid crystal material having negative dielectric anisotropy (i.e., a nematic liquid crystal material of a negative type) and a chiral agent. The liquid crystal layer 30 is able to be formed by, for example, a one drop filling method.

The first alignment film 15 and the second alignment film 25 are each provided so as to be in contact with the liquid crystal layer 30. Here, the first alignment film 15 and the second alignment film 25 are each vertical alignment films. At least one of the first alignment film 15 and the second alignment film 25 has been subjected to alignment treatment and defines the pre-tilt azimuth. Liquid crystal molecules of the liquid crystal layer 30 to which no voltage is applied are vertically aligned and liquid crystal molecules of the liquid crystal layer 30 to which a given voltage is applied are aligned in a twisted manner.

Although not illustrated here, the liquid crystal display device 100 further includes a polarizing plate arranged on the observer side of the liquid crystal layer 30. A phase difference plate may be provided between the polarizing plate and the liquid crystal layer 30. The polarizing plate (and the phase difference plate) are arranged, for example, such that display is performed in a normally black mode.

The reflection layer 12 has a first region 12a positioned in each of the plurality of pixels P and a second region 12b positioned between any two pixels P that are adjacent to each other. The uneven surface structure of the reflection layer 12 is formed in both the first region 12a and the second region 12b. That is, not only the first region 12a but also the second region 12b has the uneven surface structure.

The liquid crystal display device 100 uses any of the following driving systems.

System (A): Voltages of the same polarity are applied to the liquid crystal layer 30 for any two pixels P that are adjacent to each other in the row direction among the plurality of pixels P. This is a driving system called row line-reversal driving (H line-reversal driving), which also includes a form (such as 2H line-reversal driving) in which the polarity is reversed every two or more rows.

System (B): Voltages of the same polarity are applied to the liquid crystal layer 30 for any two pixels P that are adjacent to each other in the column direction among the plurality of pixels P. This is a driving system called column line-reversal driving (V line-reversal driving), which also includes a form (such as 2V line-reversal driving) in which the polarity is reversed every two or more columns.

System (C): Voltages of the same polarity are applied to the liquid crystal layer 30 for all the plurality of pixels P. This is a driving system called field-reversal driving (frame-reversal driving).

As described above, in the liquid crystal display device 100 of the present embodiment, the reflection layer 12 has not only the first region 12a positioned in a pixel P but also the second region 12b positioned between two adjacent pixels P. Accordingly, since the region between the pixels P is also able to contribute to reflective display, a reflection aperture ratio (ratio of the region contributing to display in the reflective mode relative to a display region) increases, thus achieving a further increase in the reflectance. As a result, it is possible to perform notably brighter display in the reflective mode.

The liquid crystal display device 100 of the present embodiment is driven by any of the systems (A), (B), and (C) described above. Thereby, the effect of increasing the reflectance (i.e., achieving brighter display) is greatly enhanced. The reason therefor will be described below.

As a driving system of a liquid crystal display device, a system called dot-reversal drive is well known and widely used. With the dot-reversal drive, voltages of different polarities are applied to a liquid crystal layer for any two pixels that are adjacent to each other among a plurality of pixels. That is, the polarity of the voltage to be applied is reversed every pixel in the row direction and the polarity of the voltage to be applied is reversed every pixel also in the column direction. In a case where polarities of voltages applied to the liquid crystal layer are opposite to each other between adjacent pixels as in the dot-reversal drive, there is a possibility that liquid crystal molecules positioned between the pixels are not aligned so as to contribute to brightness due to the influence of an oblique electric field generated between the pixels.

On the other hand, in the present embodiment, since polarities of voltages to be applied are the same (are not reversed) between pixels P adjacent to each other in at least one of the row direction and the column direction, liquid crystal molecules positioned between the pixels P to which voltages of the same polarity are applied are able to be aligned so as to contribute to brightness. Accordingly, the effect of increasing the reflectance is greatly enhanced. Note that, for further increasing the reflectance, system (C) is more desirable than system (A) or (B). That is, the field-reversal driving in which voltages of the same polarity are applied to the liquid crystal layer 30 for all the plurality of pixels P is desirable.

Note that the liquid crystal display device 100 of the present embodiment causes the region between pixels P to contribute to display in the reflective mode, and therefore, the opposing substrate 20 desirably has no black matrix between any two pixels P that are adjacent to each other among the plurality of pixels P.

Moreover, in the present embodiment, the transparent insulating layer 14 is provided so as to cover the reflection layer 12, and the pixel electrode 11 formed from the transparent conductive material is arranged on the transparent insulating layer 14. Therefore, the pixel electrode 11 formed from the transparent conductive material and the counter electrode 21 formed from the transparent conductive material face each other via the liquid crystal layer 30. On the other hand, in general reflection type liquid crystal display devices, a pixel electrode is a reflective electrode that also functions as a reflection layer, and therefore, the pixel electrode (reflective electrode) formed from a metal material and a counter electrode formed from a transparent conductive material face each other via a liquid crystal layer. Thus, flicker may be caused by a difference in the work function between the metal material and the transparent conductive material. In the present embodiment, the pixel electrode 11 and the counter electrode 21 are formed from electrode materials of the same type (both of which are transparent conductive materials), thus suppressing occurrence of such flicker.

Note that, as described above, in the general reflection type liquid crystal display devices of the related art, since the pixel electrode also functions as the reflection layer, it is difficult for the reflection layer to be arranged between pixels.

[Example of Gray-Scale Display]

An example of a configuration for performing gray-scale display in a case of memory liquid crystal display will be described.

Figure 3:
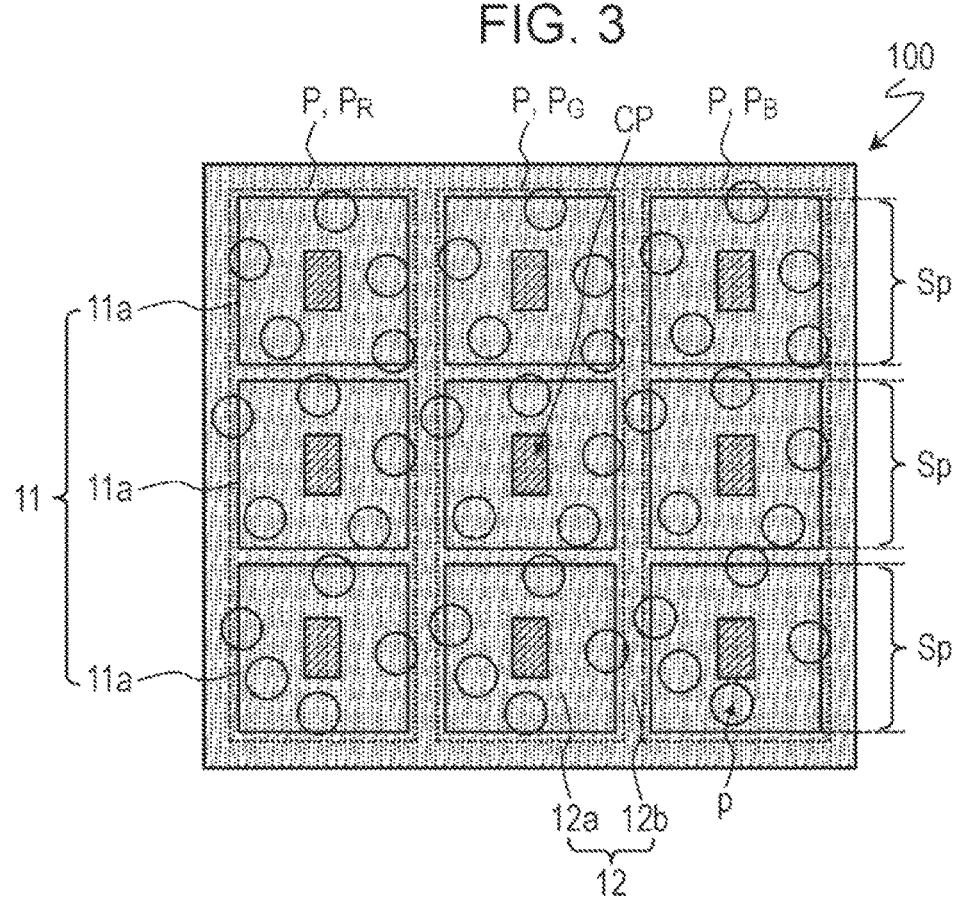
FIG. 3 is a plan view illustrating an example of a configuration in which each pixel P of the liquid crystal display device 100 is divided into a plurality of sub pixels Sp.

As illustrated in FIG. 3, each of the pixels P may be divided into a plurality of sub pixels Sp. FIG. 3 illustrates an example in which one pixel P is divided into three sub pixels Sp. In the example, the pixel electrode 11 is divided into three sub pixel electrodes 11a. Of the three sub pixel electrodes 11a, two sub pixel electrodes 11a arranged on the upper side and the lower side in the drawing are electrically connected to one common memory circuit, and one sub pixel electrode 11a arranged in the center of the drawing is electrically connected to another memory circuit. That is, two memory circuits are provided per pixel P.

Figure 4:
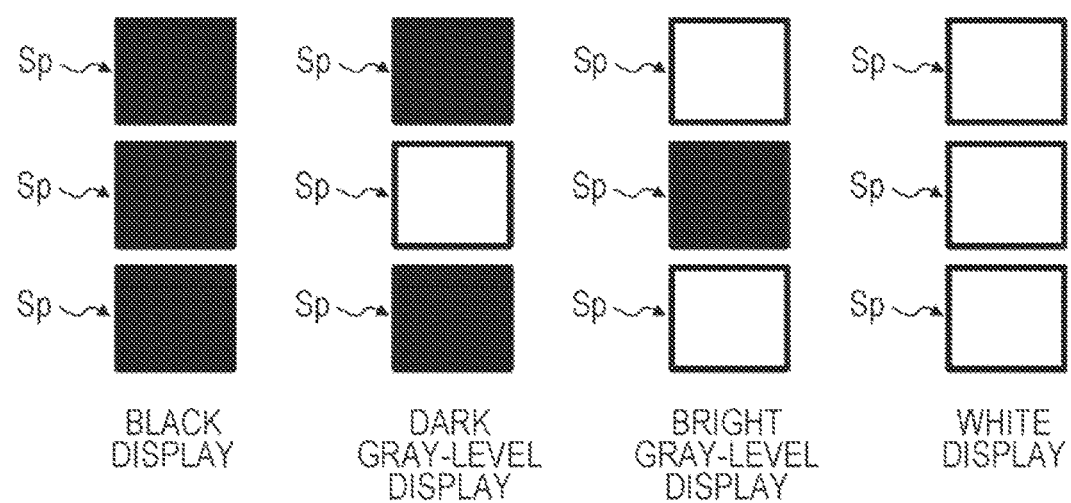
FIG. 4 illustrates an example of gray-scale display performed by using the configuration illustrated in FIG. 3.

The pixel P being divided as illustrated in FIG. 3 enables 4-level gray-scale display with an area coverage modulation method as illustrated in FIG. 4. Specifically, by establishing a black display state in all the three sub pixels Sp as illustrated in the leftmost portion in FIG. 4, the entire single pixel P is able to perform black display, and by establishing the black display state in two sub pixels Sp and a white display state in one sub pixel Sp as illustrated in the second portion from the left in FIG. 4, the entire single pixel P is able to perform dark gray-level display. Further, by establishing the white display state in two sub pixels Sp and the black display state in one sub pixel Sp as illustrated in the third portion from the left in FIG. 4, the entire single pixel P is able to perform bright gray-level display, and by establishing the white display state in all the three sub pixels Sp as illustrated in the rightmost portion in FIG. 4, the entire single pixel P is able to perform white display.

Note that three sub pixel electrodes 11a may be electrically connected to different memory circuits separately (that is, three memory circuits may be provided in each of the pixels P).

[Verification Results of Effect of Improving Reflection Aperture Ratio and Reflectance]

The results of manufacturing the liquid crystal display device 100 of the present embodiment (Example 1) and verifying the effect of improving the reflection aperture ratio and the reflectance will be described. The screen size of the manufactured liquid crystal display device 100 is 1.2 inches and the size of one pixel P is 126 μm in height and 42 μm in width. Of the first alignment film 15 of the TFT substrate 10 and the second alignment film 25 of the opposing substrate 20, only the second alignment film 25 is subjected to rubbing treatment. Thus, of the first alignment film 15 and the second alignment film 25, only the second alignment film 25 defines the pre-tilt azimuth. The dimension (cell gap) of the liquid crystal layer 30 is 3 μm, and a chiral agent is added to the liquid crystal material of the liquid crystal layer 30 such that the twist angle is 70° when a white voltage is applied (i.e., in a state where the liquid crystal molecules are horizontally aligned). The field-reversal driving (system (C)) is adopted as the driving system.

Figure 5:
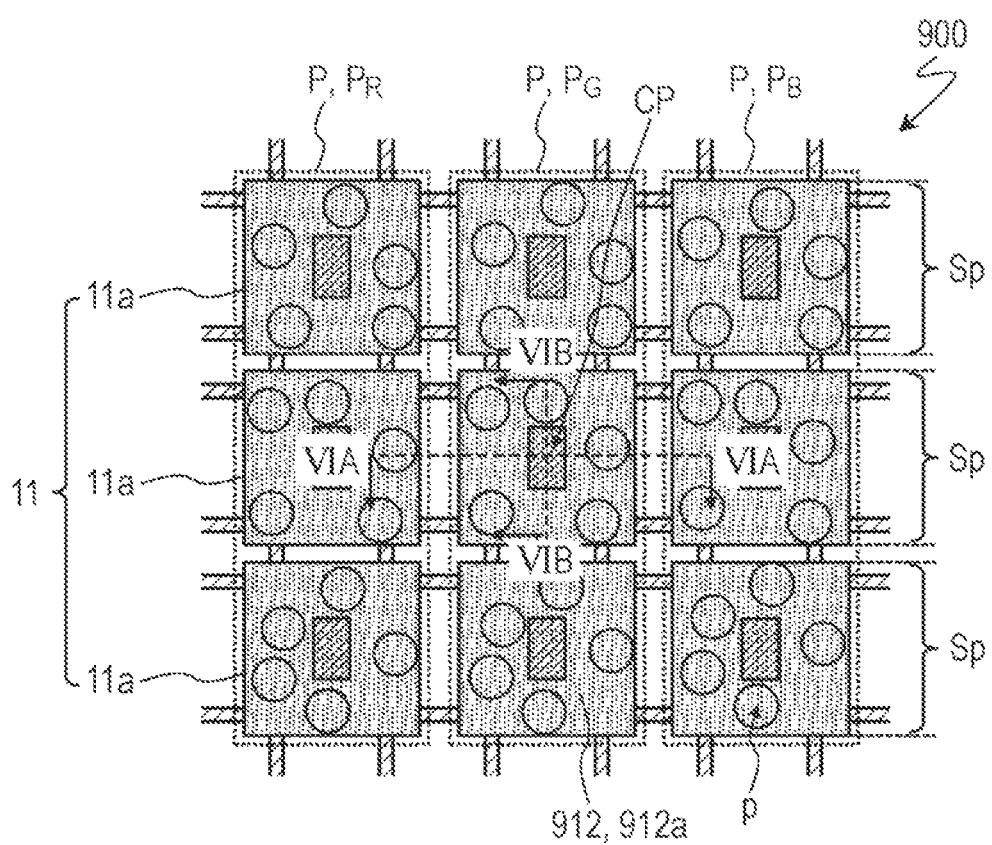
FIG. 5 is a plan view illustrating a liquid crystal display device 900 of a comparative example and illustrates regions corresponding to three pixels P of the liquid crystal display device 900.
Figure 6A:
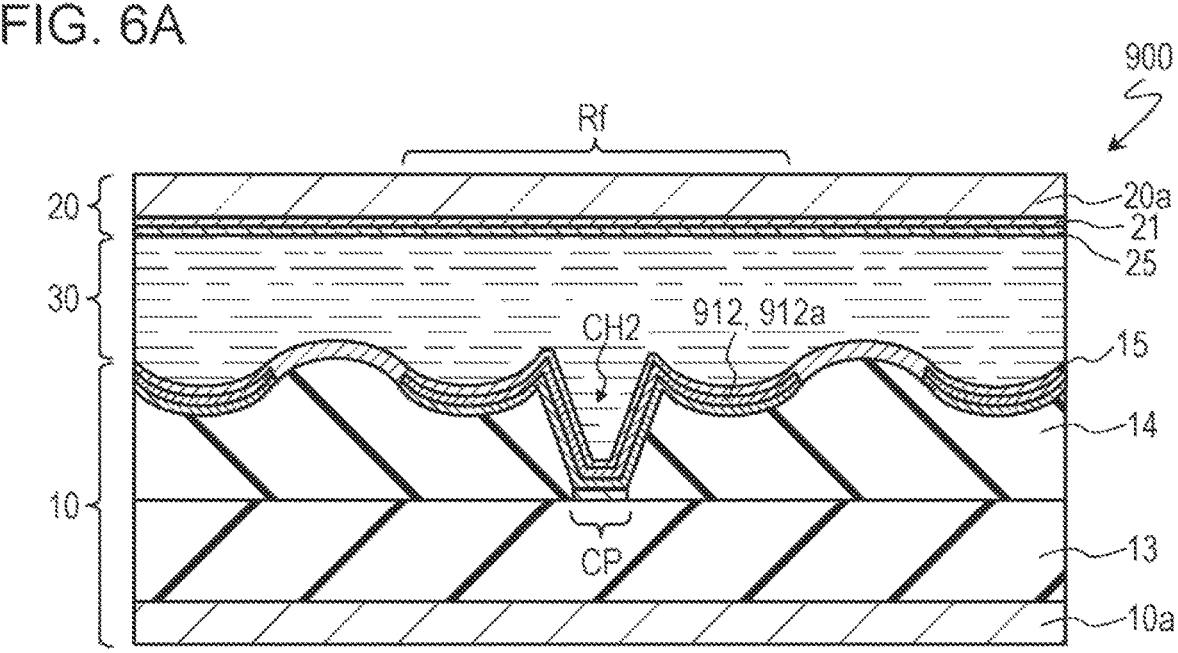
FIG. 6A is a sectional view illustrating the liquid crystal display device 900 and illustrates a sectional structure along line VIA-VIA in FIG. 5.
Figure 6B:
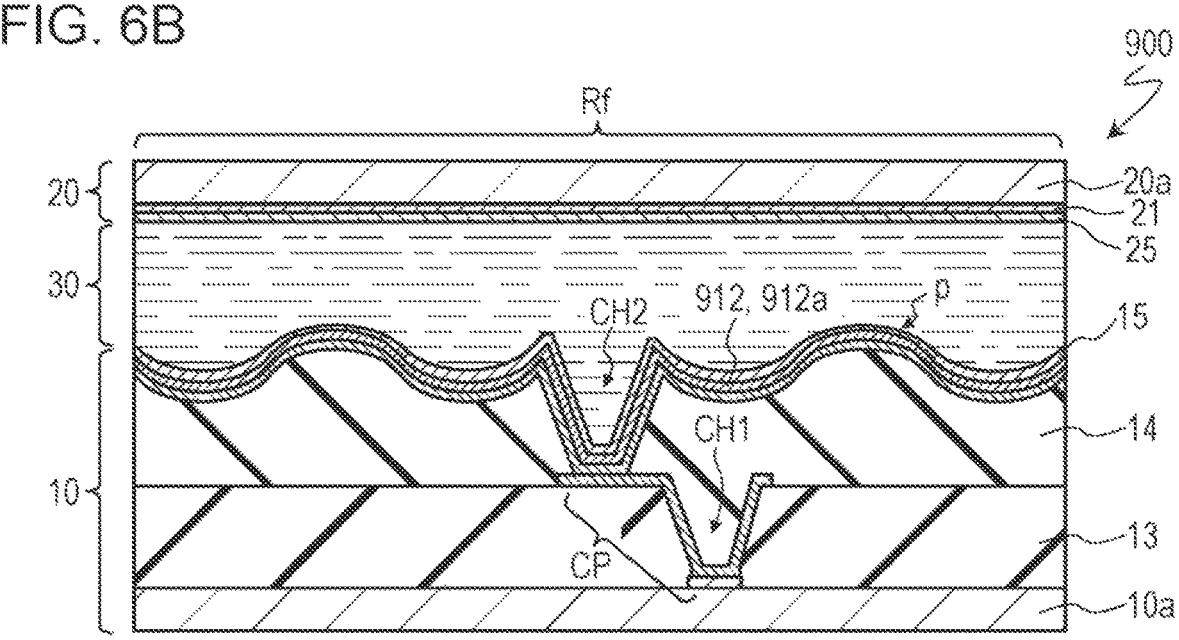
FIG. 6B is a sectional view illustrating the liquid crystal display device 900 and illustrates a sectional structure along line VIB-VIB in FIG. 5.

In addition to Example 1, liquid crystal display devices of Comparative examples 1 and 2 are additionally manufactured and compared with the liquid crystal display device in Example 1. FIGS. 5, 6A, and 6B illustrate a liquid crystal display device 900 of Comparative example 1. FIG. 5 is a plan view of the liquid crystal display device 900 and illustrates regions corresponding to three pixels P of the liquid crystal display device 900. FIGS. 6A and 6B are sectional views illustrating the liquid crystal display device 900 and illustrate sectional structures along line VIA-VIA and line VIB-VIB in FIG. 5, respectively.

As illustrated in FIGS. 5, 6A, and 6B, the liquid crystal display device 900 of Comparative example 1 differs from the liquid crystal display device 100 of the present embodiment in that a reflection layer (reflective electrode) 912 that also functions as a pixel electrode is provided on the second interlayer insulating layer 14. The reflective electrode 912 has a region 912a positioned in each of the pixels P but does not have a region positioned between adjacent pixels P. Here, the liquid crystal display device 900 is used as a reflection type liquid crystal display device. The liquid crystal display device 900 adopts the field-reversal driving as the driving system.

The liquid crystal display device of Comparative example 2 has a pixel structure (electrode structure) similar to that of the liquid crystal display device 100 of Example 1 but differs from the liquid crystal display device of Example 1 in that dot-reversal drive is performed.

Table 1 indicates the reflection aperture ratio and the reflectance obtained in Comparative examples 1 and 2 and Example 1.

TABLE 1

|  | Comparative example 1 | Comparative example 2 | Example 1 |
|---|---|---|---|
| Reflection aperture ratio | 0.62 | 0.85 | 0.85 |
| Reflectance | 1.00 | 1.04 | 1.29 |

As can be seen from Table 1, in Example 1, the reflection aperture ratio and the reflectance increase compared with Comparative example 1, and both the reflection aperture ratio and the reflectance are improved. Moreover, in Comparative example 2, the reflection aperture ratio increases but the reflectance slightly increases compared with Comparative example 1. Accordingly, it is confirmed that, in a case where voltages of different polarities are applied to two adjacent pixels P, even when the reflection layer 12 is positioned between the pixels P, liquid crystal molecules between the pixels P do not contribute much to the increase in brightness.

[Other Aspects]

Although an example of the backplane circuit having the memory circuit per pixel P is indicated here, the backplane circuit is not limited to the example. As in general active matrix substrates, the backplane circuit may include a TFT connected to the pixel electrode 11, a gate bus line and a source bus line that are connected to the TFT, and the like. The TFT is, for example, a TFT (refer to Japanese Unexamined Patent Application Publication No. 2014-007399) that has, as an active layer, an amorphous silicon layer, a polysilicon layer, or an oxide semiconductor layer containing an In—Ga—Zn—O-based semiconductor. For reference, Japanese Unexamined Patent Application Publication No. 2014-007399 is incorporated herein.

Note that although a VAHAN mode in which only one of the vertical alignment films defines the pre-tilt azimuth is exemplified as Example 1, a VATN mode in which both the vertical alignment films define the pre-tilt azimuth may be adopted. Moreover, horizontal alignment films may be used as the first alignment film 15 and the second alignment film 25 instead of the vertical alignment films. In addition, the liquid crystal layer 30 may contain a nematic liquid crystal material having positive dielectric anisotropy (i.e., a nematic liquid crystal material of a positive type) instead of a nematic liquid crystal material having negative dielectric anisotropy, or may contain no chiral agent.

Embodiment 2

Figure 7:
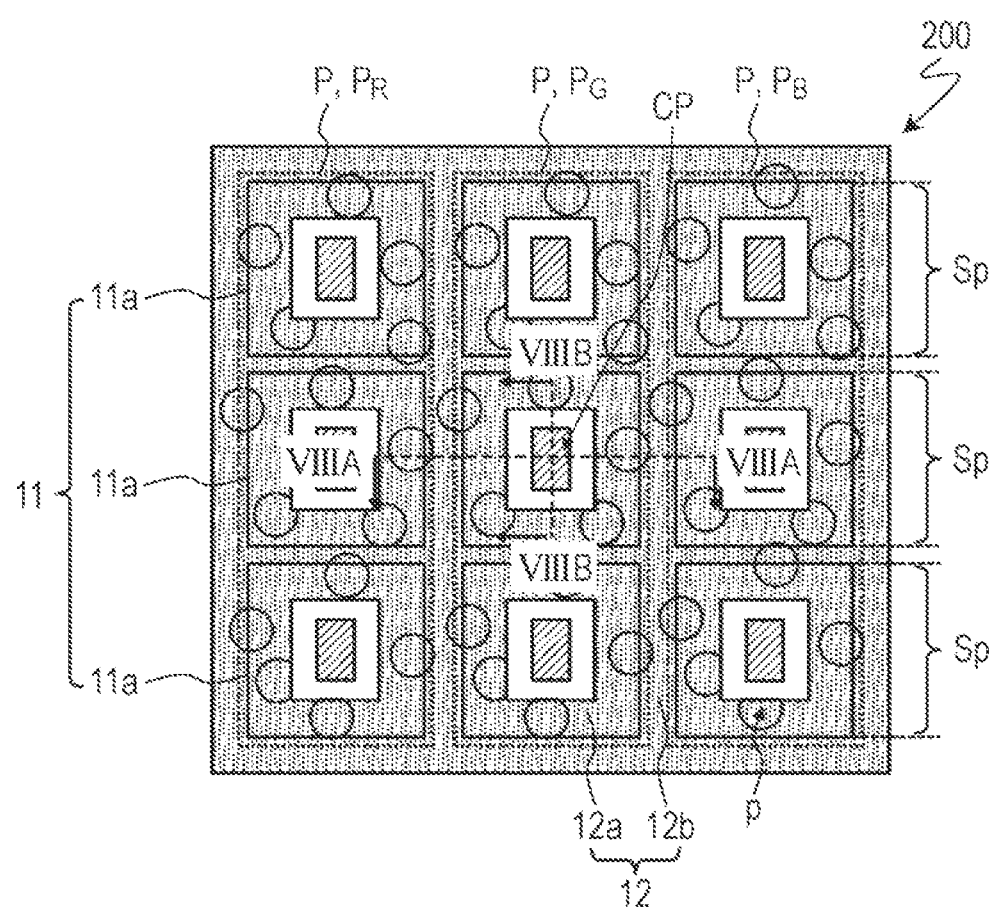
FIG. 7 is a plan view schematically illustrating another liquid crystal display device 200 according to an embodiment of the disclosure and illustrates regions corresponding to three pixels P of the liquid crystal display device 200.
Figure 8A:
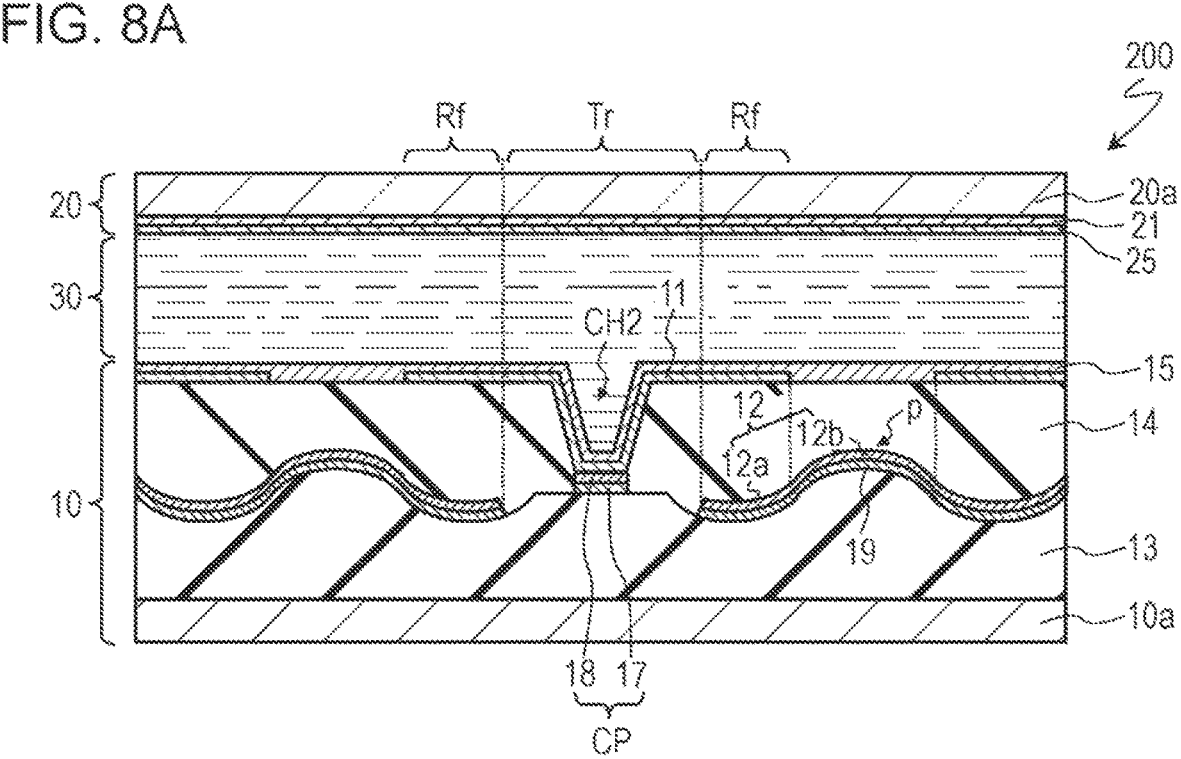
FIG. 8A is a sectional view schematically illustrating the liquid crystal display device 200 and illustrates a sectional structure along line VIIIA-VIIIA in FIG. 7.
Figure 8B:
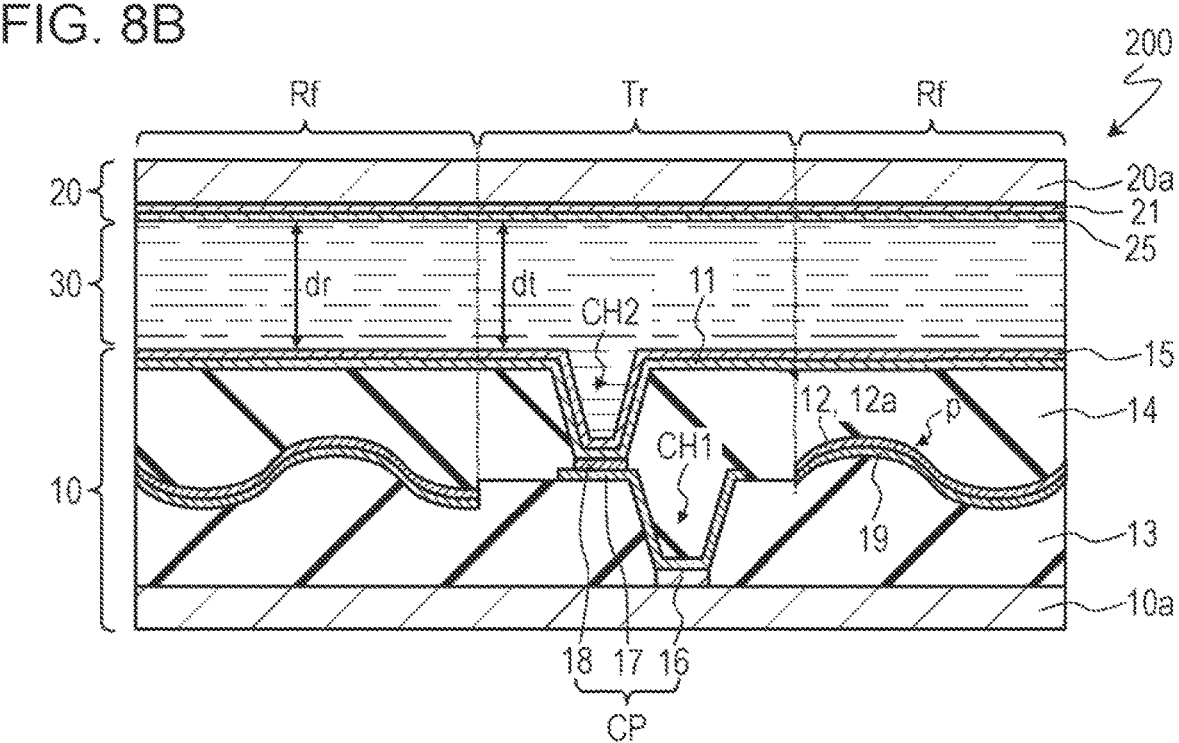
FIG. 8B is a sectional view schematically illustrating the liquid crystal display device 200 and illustrates a sectional structure along line VIIIB-VIIIB in FIG. 7.

A liquid crystal display device 200 of the present embodiment will be described with reference to FIGS. 7, 8A, and 8B. The liquid crystal display device 200 of the present embodiment is a transflective type liquid crystal display device. FIG. 7 is a plan view schematically illustrating the liquid crystal display device 200 and illustrates regions corresponding to three pixels P of the liquid crystal display device 200. FIGS. 8A and 8B are sectional views schematically illustrating the liquid crystal display device 200 and illustrate sectional structures along line VIIIA-VIIIA and line VIIIB-VIIIB in FIG. 7, respectively. The following description focuses on a difference between the liquid crystal display device 200 of the present embodiment and the liquid crystal display device 100 of Embodiment 1.

The liquid crystal display device 200 of the present embodiment differs from the liquid crystal display device 100 of Embodiment 1 in that each of the plurality of pixels P has, in addition to the reflection region Rf, a transmission region Tr for performing display in a transmissive mode. A portion of the pixel electrode 11 is positioned in the transmission region Tr. In the illustrated example, the transmission region Tr is positioned in the center of the pixel P. Here, a dimension dt of the liquid crystal layer 30 in the transmission region Tr and a dimension dr of the liquid crystal layer 30 in the reflection region Rf are the same (i.e., dt=dr).

The ratio of the area of the transmission region Tr relative to the pixel P can be appropriately set in accordance with the use or the like and is, for example, 20% or more and 90% or less. The position and shape of the transmission region Tr in the pixel P can be also appropriately set in accordance with the use or the like.

Also in the liquid crystal display device 200 of the present embodiment, since the reflection layer 12 has the second region 12b positioned between two adjacent pixels P, the region between the pixels P is also able to contribute to reflective display. Thus, the reflection aperture ratio increases and a further increase in the reflectance is able to be achieved.

The liquid crystal display device 200 of the present embodiment can deal with the following problems of transflective type liquid crystal display devices of the related art.

A configuration of a transflective type liquid crystal display device, in which a region between adjacent pixels is used for display in the transmissive mode, is known. However, since there is no pixel electrode between pixels, it is difficult for liquid crystal molecules positioned between the pixels to be aligned sufficiently in a desired direction, thus posing a problem of low transmittance. Further, a region in which consistency between alignment due to an oblique electric field generated near an edge of a pixel electrode and alignment due to rubbing treatment is poor and alignment of liquid crystal molecules is unstable is provided between the pixels. In this manner, the region between the pixels, in which alignment is unstable, is used for display in the transmissive mode, and therefore, display failure (such as an afterimage) due to alignment failure is caused in display in the transmissive mode. Further, a change in alignment due to an uneven surface structure of a reflective electrode affects even the region between the pixels (region used for transmissive display), which also results in display failure.

On the other hand, in the liquid crystal display device 200 of the present embodiment, since the pixel electrode 11 is in the transmission region Tr, liquid crystal molecules in the transmission region Tr are able to be aligned sufficiently in a desired direction. As a result, the transmittance increases.

Since the region with stable alignment is used for display in the transmissive mode and it is not necessary for the pixel electrode 11 to have an uneven surface structure (it is sufficient that the reflection layer 12 separated from the pixel electrode 11 has an uneven surface structure), the display failure caused by the alignment failure in display in the transmissive mode is able to be reduced.

Here, the results of verifying the effect of the present embodiment will be described. The effect is verified by manufacturing the liquid crystal display device 200 of the present embodiment (Example 2) and comparing the liquid crystal display device 200 with the liquid crystal display device in Comparative example 3. In Comparative example 3, the liquid crystal display device 900 illustrated in FIG. 5 and the like is used as a transflective type liquid crystal display device, and a gap between pixel electrodes 912 is used for display in the transmissive mode.

Table 2 indicates the results of verifying the reflectance, the transmittance, and the degree of occurrence of afterimages in Comparative example 3 and Example 2. The reflectance and the transmittance indicate relative values obtained when the reflectance and the transmittance of Comparative example 3 are expressed as 1.0. The degree of occurrence of afterimages is verified by visual observation and a case where occurrence of afterimages is sufficiently suppressed is represented by "good" and a case where occurrence of afterimages is not suppressed is represented by "poor".

TABLE 2

|  | Comparative example 3 | Example 2 |
| --- | --- | --- |
| Reflectance | 1.00 | 1.00 |
| Transmittance | 1.00 | 1.00 |
| Suppression of occurrence of afterimages | Poor | Good |

As can be seen from Table 2, in Example 2, the reflectance and the transmittance are kept at an equivalent level to Comparative example 3 while occurrence of afterimages caused by alignment failure is able to be sufficiently suppressed. As a result, according to the present embodiment, it is possible to improve display quality and yield of the transflective type liquid crystal display device.

Embodiment 3

Figure 9:
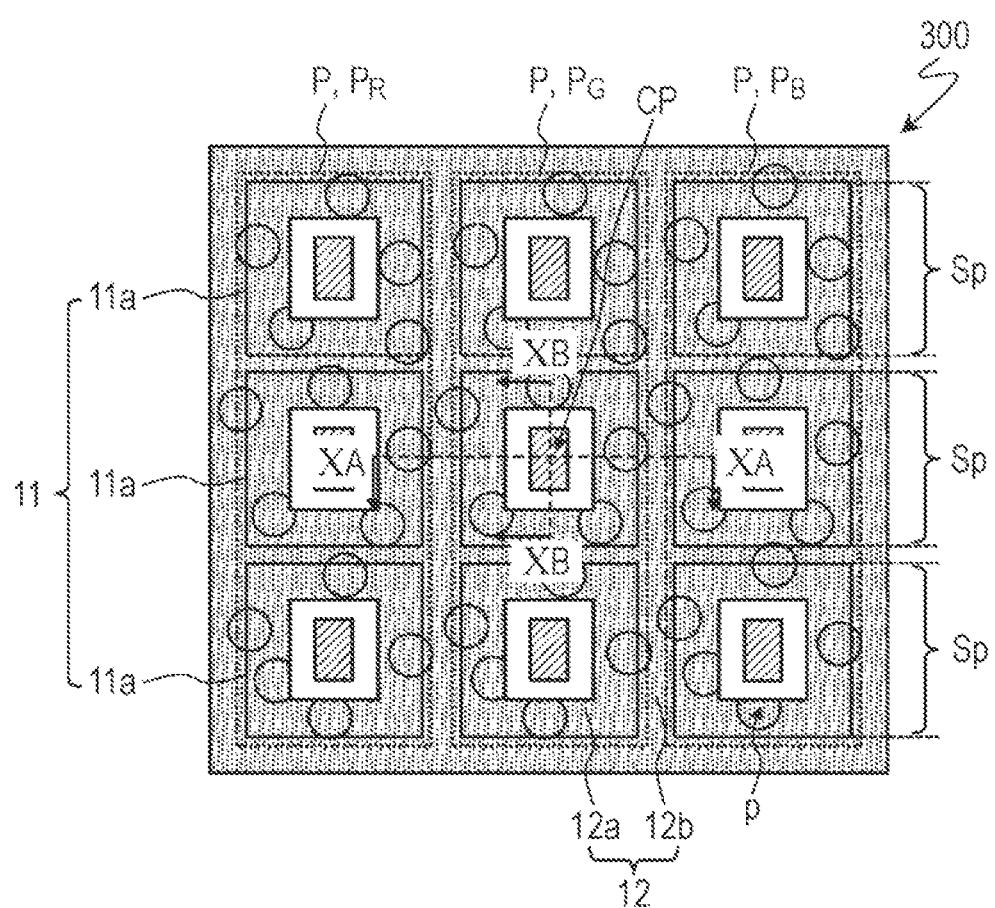
FIG. 9 is a plan view schematically illustrating still another liquid crystal display device 300 according to an embodiment of the disclosure and illustrates regions corresponding to three pixels P of the liquid crystal display device 300.
Figure 10A:
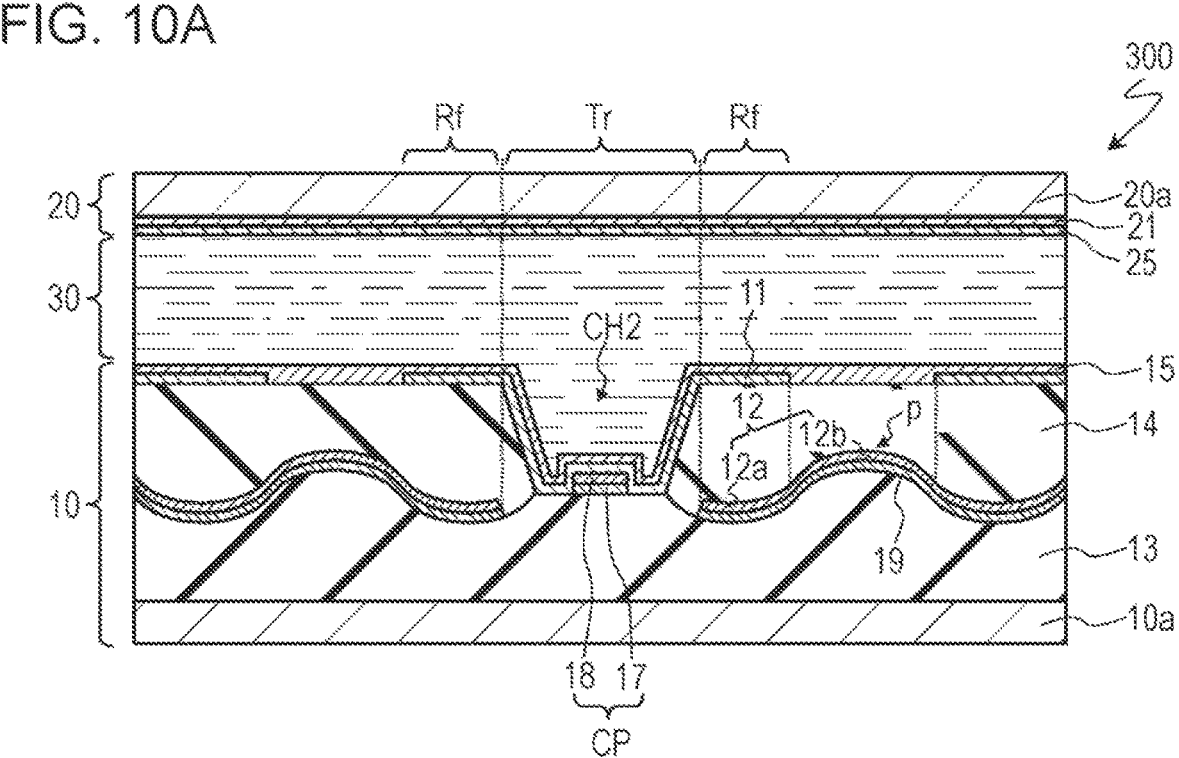
FIG. 10A is a sectional view schematically illustrating the liquid crystal display device 300 and illustrates a sectional structure along line XA-XA in FIG. 9.
Figure 10B:
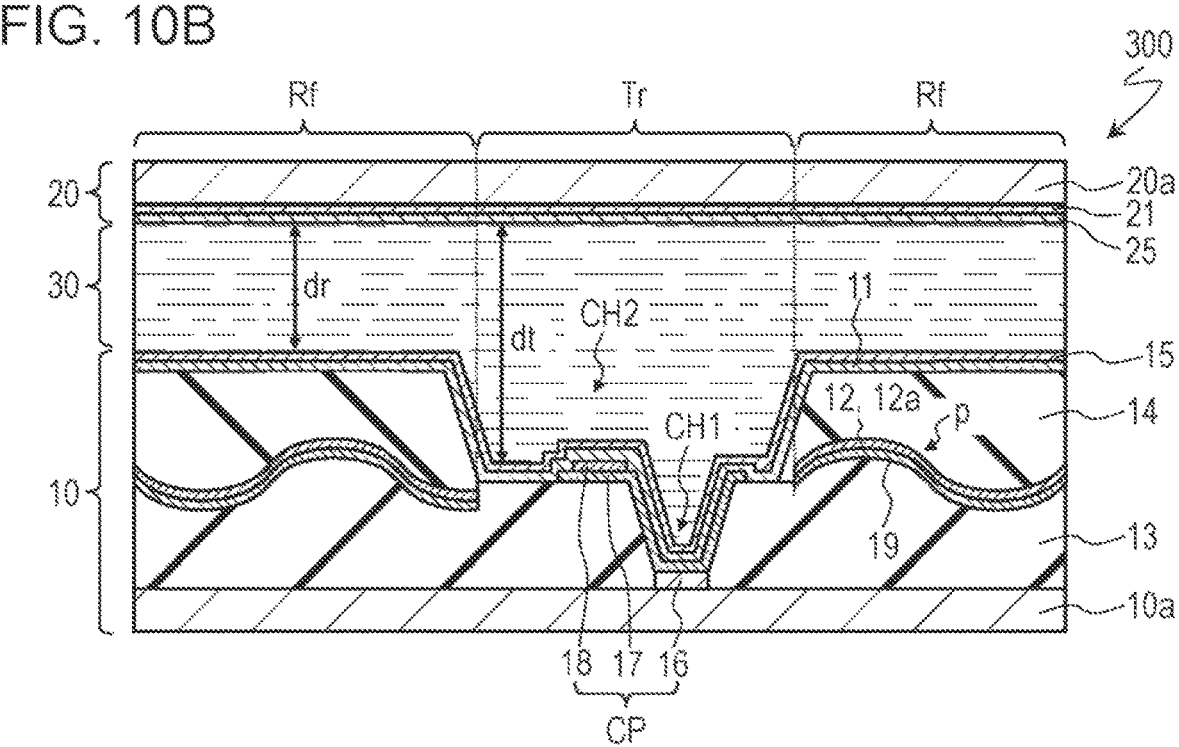
FIG. 10B is a sectional view schematically illustrating the liquid crystal display device 300 and illustrates a sectional structure along line XB-XB in FIG. 9.

A liquid crystal display device 300 of the present embodiment will be described with reference to FIGS. 9, 10A, and 10B. The liquid crystal display device 300 of the present embodiment is a transflective type liquid crystal display device. FIG. 9 is a plan view schematically illustrating the liquid crystal display device 300 and illustrates regions corresponding to three pixels P of the liquid crystal display device 300. FIGS. 10A and 10B are sectional views schematically illustrating the liquid crystal display device 300 and illustrate sectional structures along line XA-XA and line XB-XB in FIG. 9, respectively. The following description focuses on a difference between the liquid crystal display device 300 of the present embodiment and the liquid crystal display device 200 of Embodiment 2.

As illustrated in FIGS. 9, 10A, and 10B, the liquid crystal display device 300 of the present embodiment differs from the liquid crystal display device 200 of Embodiment 2 in that the dimension dt of the liquid crystal layer 30 in the transmission region Tr is greater than the dimension dr of the liquid crystal layer 30 in the reflection region Rf (i.e., dt>dr). Specifically, by forming the second contact hole CH2 of the second interlayer insulating layer 14 to be larger than the second contact hole CH2 in the liquid crystal display device 200 of Embodiment 2, the cell gap dt of the transmission region Tr becomes larger than the cell gap dr of the reflection region Rf.

While light used for display in the transmissive mode passes through the liquid crystal layer 30 only once, light used for display in the reflective mode passes through the liquid crystal layer 30 twice. Therefore, when the cell gap dt of the transmission region Tr is larger than the cell gap dr of the reflection region Rf as in the present embodiment, a difference between retardation of the liquid crystal layer 30 for the light used for display in the transmissive mode and retardation of the liquid crystal layer 30 for the light used for display in the reflective mode is able to be reduced, and voltage-luminance characteristics that are suitable for both the transmission region Tr and the reflection region Rf (that ensure brighter display) are able to be obtained.

For performing brighter display in both the transmission region Tr and the reflection region Rf, it is desirable that the cell gap dt of the transmission region Tr and the cell gap dr of the reflection region Rf substantially satisfy the relation of dt=2dr.

Note that, when alignment restriction by which either the first alignment film 15 or the second alignment film 25 is subjected to alignment treatment (for example, rubbing treatment) and liquid crystal molecules are aligned in a twisted manner at the time of voltage application as described in Embodiment 1 is performed in the present embodiment, a difference between the cell gaps of the transmission region Tr and the reflection region Rf may hinder both the regions from simultaneously achieving optimum alignment states (specifically, alignment states that provide brighter display). Therefore, in the present embodiment, the twist angle at the time of voltage application may be 0° in the absence of a chiral agent added to the liquid crystal material of the liquid crystal layer 30.

Alternatively, the twist angle at the time of voltage application may differ between the transmission region Tr and the reflection region Rf. When at least one of the first alignment film 15 and the second alignment film 25 defines the pre-tilt azimuth that differs between the transmission region Tr and the reflection region Rf, the twist angle at the time of voltage application is able to differ between the transmission region Tr and the reflection region Rf. In this case, alignment treatment for the alignment film (at least one of the first alignment film 15 and the second alignment film 25) is desirably performed with light-alignment treatment.

Here, the results of verifying the effect of the present embodiment will be described. The effect is verified by manufacturing the liquid crystal display device 300 of the present embodiment (Example 3) and comparing the liquid crystal display device 300 with the liquid crystal display device in Example 2. In Example 3, the twist angle at the time of voltage application is set to 0° in the absence of a chiral agent added to the liquid crystal material. The cell gap dr of the reflection region Rf is set to 2.0 μm and the cell gap dt of the transmission region Tr is set to 4.0 μm.

Table 3 indicates the reflectance and the transmittance in Examples 2 and 3. The reflectance and the transmittance indicate relative values obtained when the reflectance and the transmittance of Example 2 are expressed as 1.0. Table 3 also indicates the results when the liquid crystal display device 300 of Example 3 is manufactured such that the reflectance of Example 3 is the same as the reflectance of Example 2.

TABLE 3

|  | Example 2 | Example 3 |
|---|---|---|
| Reflectance | 1.00 | 1.00 |
| Transmittance | 1.00 | 2.00 |

As can be seen from Table 3, in Example 3, the transmittance increases compared with Example 2 while the reflectance which is the same as that in Example 2 is kept. Such an effect is obtained by the cell gap dt of the transmission region Tr being larger than the cell gap dr of the reflection region Rf.

Table 4 indicates the results when the liquid crystal display device 300 of Example 3 is manufactured such that the transmittance of Example 3 is the same as the transmittance of Example 2.

TABLE 4

|  | Example 2 | Example 3 |
|---|---|---|
| Reflectance | 1.00 | 1.15 |
| Transmittance | 1.00 | 1.00 |

As can be seen from Table 4, in Example 3, the reflectance increases compared with Example 2 while the transmittance which is the same as that in Example 2 is kept. This is because Example 3 achieves the transmittance equivalent to that in Example 2 even when the transmission region Tr is narrower than that in Example 2, thus making it possible to make the reflection region Rf wider than that in Example 2.

Embodiment 4

Figure 11:
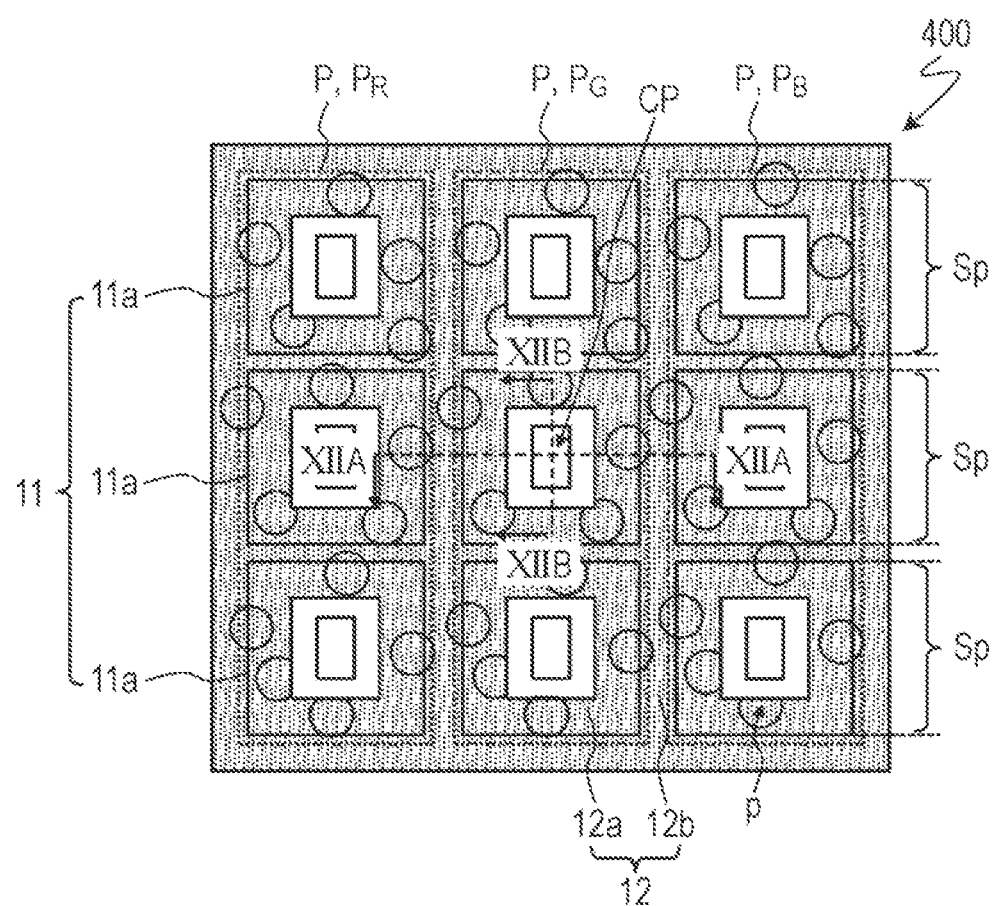
FIG. 11 is a plan view schematically illustrating still another liquid crystal display device 400 according to an embodiment of the disclosure and illustrates regions corresponding to three pixels P of the liquid crystal display device 400.
Figure 12A:
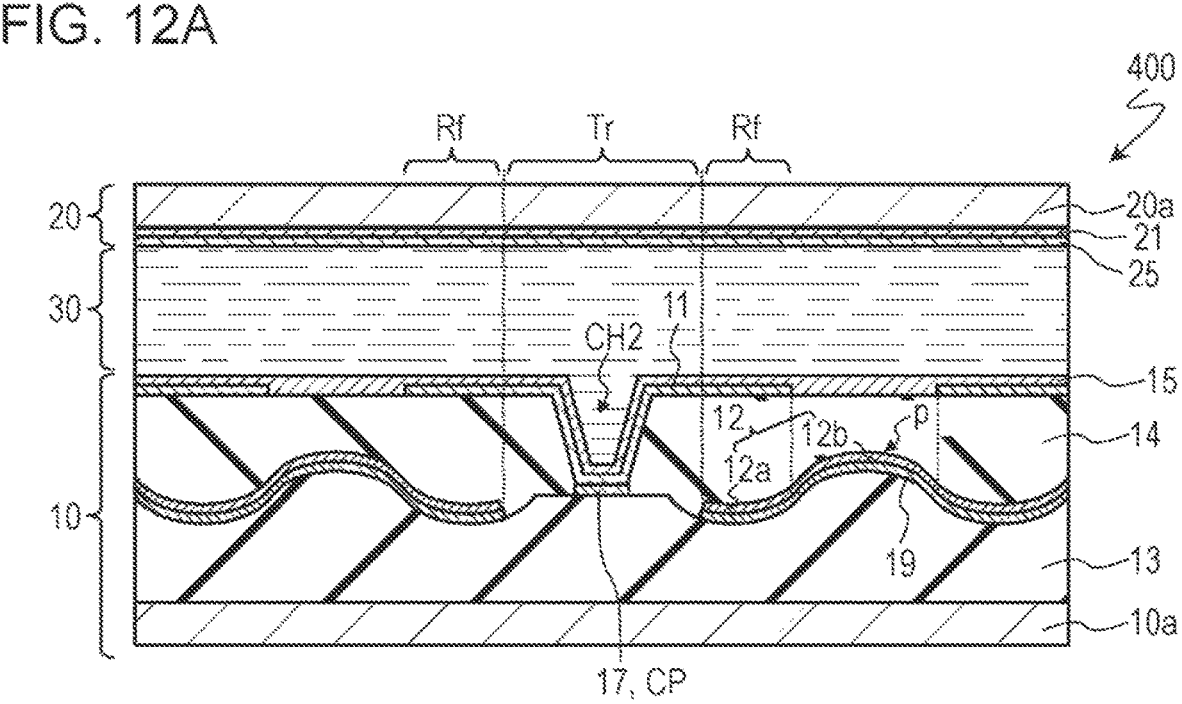
FIG. 12A is a sectional view schematically illustrating the liquid crystal display device 400 and illustrates a sectional structure along line XIIA-XIIA in FIG. 11.
Figure 12B:
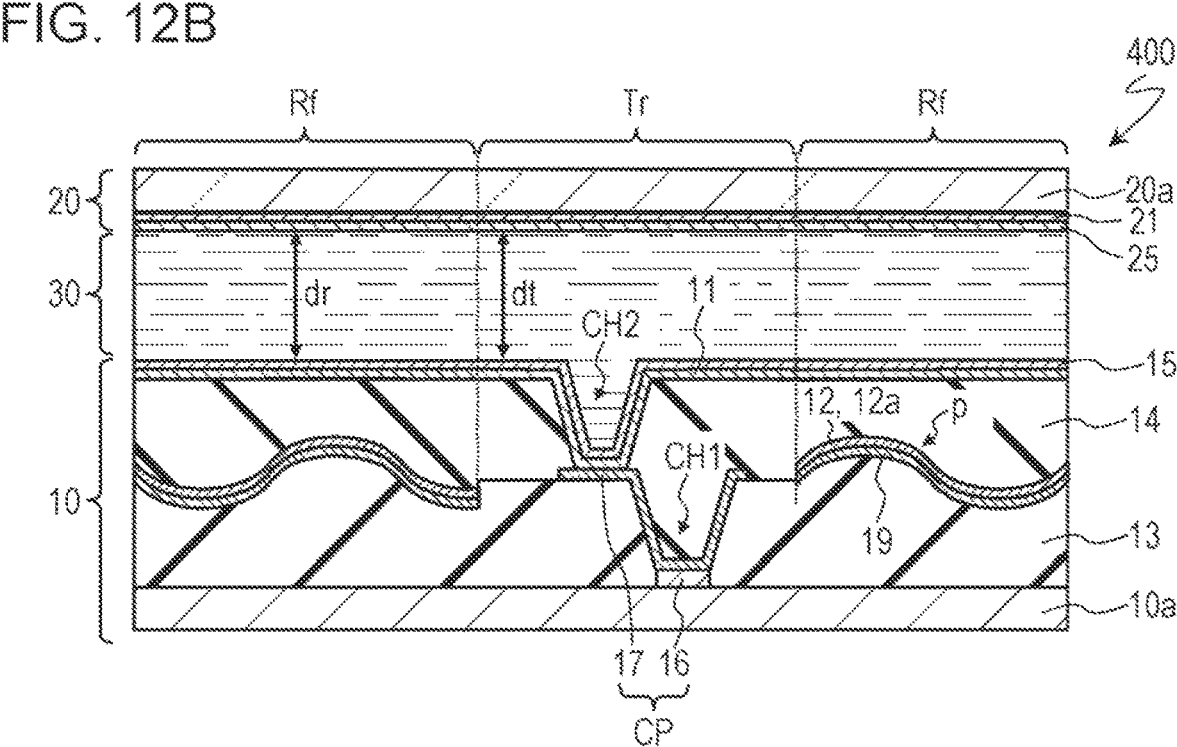
FIG. 12B is a sectional view schematically illustrating the liquid crystal display device 400 and illustrates a sectional structure along line XIIB-XIIB in FIG. 11.

A liquid crystal display device 400 of the present embodiment will be described with reference to FIGS. 11, 12A, and 12B. The liquid crystal display device 400 of the present embodiment is a transflective type liquid crystal display device. FIG. 11 is a plan view schematically illustrating the liquid crystal display device 400 and illustrates regions corresponding to three pixels P of the liquid crystal display device 400. FIGS. 12A and 12B are sectional views schematically illustrating the liquid crystal display device 400 and illustrate sectional structures along line XIIA-XIIA and line XIIB-XIIB in FIG. 11, respectively. The following description focuses on a difference between the liquid crystal display device 400 of the present embodiment and the liquid crystal display device 200 of Embodiment 2.

The liquid crystal display device 400 of the present embodiment illustrated in FIGS. 11, 12A, and 12B differs from the liquid crystal display device 200 of Embodiment 2 in that the contact portion CP that electrically connects the pixel electrode 11 and the backplane circuit in the first contact hole CH1 and the second contact hole CH2 that are formed in the transmission region Tr is formed from a transparent conductive material (i.e., the contact portion CP is transparent).

In the present embodiment, the contact portion CP is constituted by the first contact electrode 16 and the second contact electrode 17. That is, the contact portion CP of the liquid crystal display device 400 differs from the contact portion CP of the liquid crystal display device 200 of Embodiment 2 and does not include the third contact electrode 18 formed from the same metal film as the reflection layer 12. Further, both the first contact electrode 16 and the second contact electrode 17 that are included in the contact portion CP of the liquid crystal display device 400 are formed from a transparent conductive material. Thus, the entire contact portion CP of the liquid crystal display device 400 is transparent. Note that a material similar to that of the pixel electrode 11 or the like is usable as the transparent conductive material for forming the first contact electrode 16 and the second contact electrode 17.

In this manner, in the liquid crystal display device 400 of the present embodiment, since the contact portion CP is formed from the transparent conductive material, a region in which the contact portion CP is provided is usable for display in the transmissive mode (i.e., the region can suitably function as the transmission region Tr). Accordingly, it is possible to further increase the transmittance compared with the liquid crystal display device 200 of Embodiment 2.

Here, the results of verifying the effect of the present embodiment will be described. The effect is verified by manufacturing the liquid crystal display device 400 of the present embodiment (Example 4) and comparing the liquid crystal display device 400 with the liquid crystal display device in Example 2.

Table 5 indicates the reflectance and the transmittance in Examples 2 and 4. The reflectance and the transmittance indicate relative values obtained when the reflectance and the transmittance of Example 2 are expressed as 1.0. Table 5 also indicates the results when the liquid crystal display device 400 of Example 4 is manufactured such that the reflectance of Example 4 is the same as the reflectance of Example 2.

TABLE 5

|  | Example 2 | Example 4 |
|---|---|---|
| Reflectance | 1.00 | 1.00 |
| Transmittance | 1.00 | 1.62 |

As can be seen from Table 5, in Example 4, the transmittance increases compared with Example 2 while the reflectance which is the same as that in Example 2 is kept. Such an effect is obtained when the region in which the contact portion CP is provided functions as the transmission region Tr.

Table 6 indicates the results when the liquid crystal display device 400 of Example 4 is manufactured such that the transmittance of Example 4 is the same as the transmittance of Example 2.

TABLE 6

|  | Example 2 | Example 4 |
|---|---|---|
| Reflectance | 1.00 | 1.18 |
| Transmittance | 1.00 | 1.00 |

As can be seen from Table 6, in Example 4, the reflectance increases compared with Example 2 while the transmittance which is the same as that in Example 2 is kept. This is because Example 4 achieves the transmittance equivalent to that in Example 2 even when the transmission region Tr is narrower than that in Example 2, thus making it possible to make the reflection region Rf wider than that in Example 2.

Embodiment 5

Figure 13:
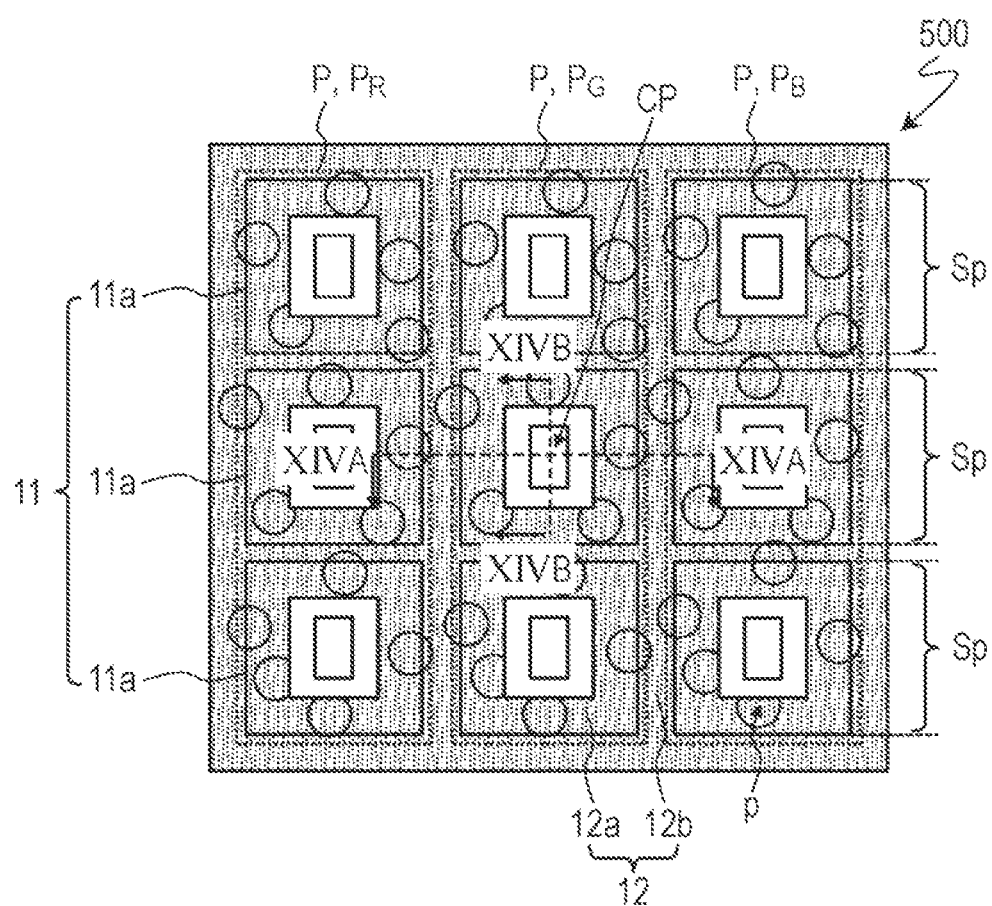
FIG. 13 is a plan view schematically illustrating still another liquid crystal display device 500 according to an embodiment of the disclosure and illustrates regions corresponding to three pixels P of the liquid crystal display device 500.
Figure 14A:
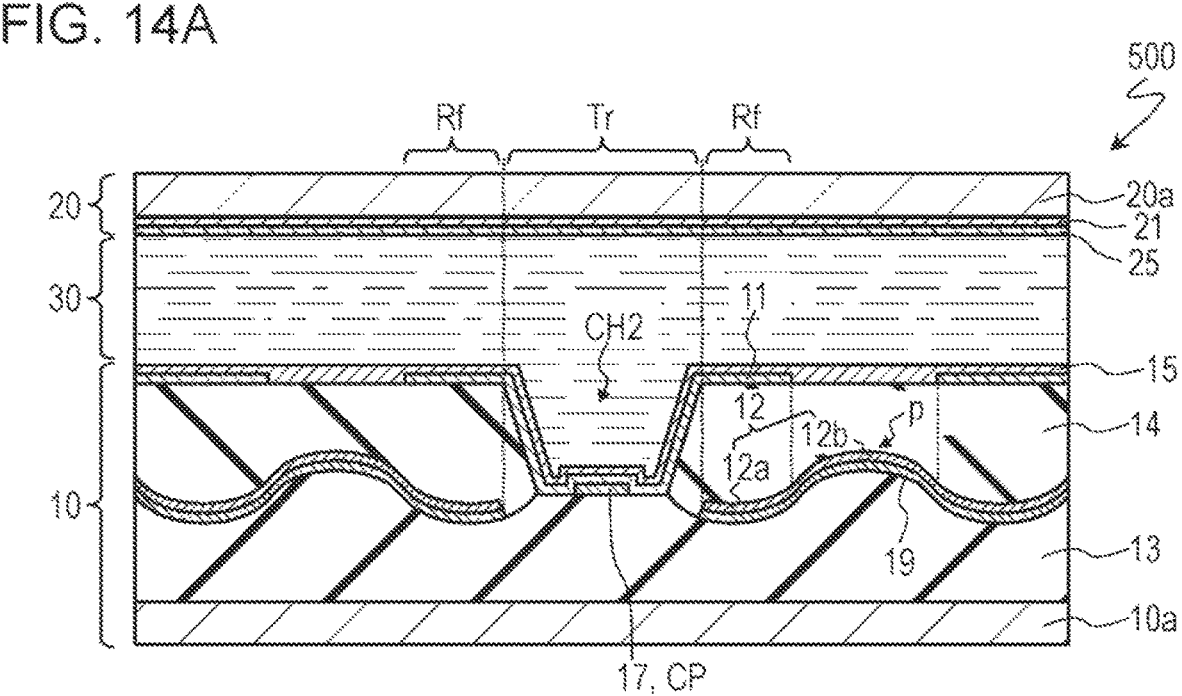
FIG. 14A is a sectional view schematically illustrating the liquid crystal display device 500 and illustrates a sectional structure along line XIVA-XIVA in FIG. 13.
Figure 14B:
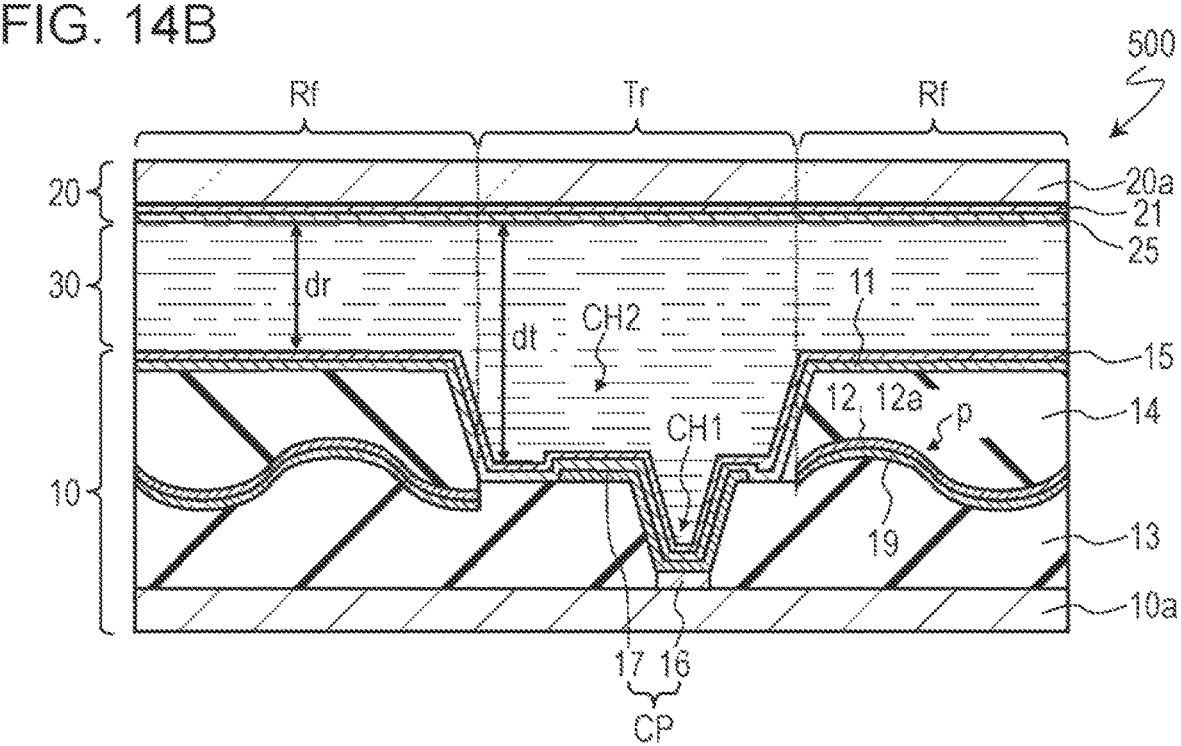
FIG. 14B is a sectional view schematically illustrating the liquid crystal display device 500 and illustrates a sectional structure along line XIVB-XIVB in FIG. 13.

A liquid crystal display device 500 of the present embodiment will be described with reference to FIGS. 13, 14A, and 14B. The liquid crystal display device 500 of the present embodiment is a transflective type liquid crystal display device. FIG. 13 is a plan view schematically illustrating the liquid crystal display device 500 and illustrates regions corresponding to three pixels P of the liquid crystal display device 500. FIGS. 14A and 14B are sectional views schematically illustrating the liquid crystal display device 500 and illustrate sectional structures along line XIVA-XIVA and line XIVB-XIVB in FIG. 13, respectively. The following description focuses on a difference between the liquid crystal display device 500 of the present embodiment and the liquid crystal display device 200 of Embodiment 2.

The liquid crystal display device 500 of the present embodiment illustrated in FIGS. 13, 14A, and 14B differs from the liquid crystal display device 200 of Embodiment 2 in that the contact portion CP is formed from a transparent conductive material (i.e., the contact portion CP is transparent).

In the present embodiment, the contact portion CP does not include the third contact electrode 18 formed from the same metal film as the reflection layer 12. Both the first contact electrode 16 and the second contact electrode 17 that are included in the contact portion CP are formed from a transparent conductive material. Thus, the entire contact portion CP of the liquid crystal display device 500 is transparent.

The liquid crystal display device 500 of the present embodiment differs from the liquid crystal display device 200 of Embodiment 2 in that the dimension dt of the liquid crystal layer 30 in the transmission region Tr is greater than the dimension dr of the liquid crystal layer 30 in the reflection region Rf (i.e., dt>dr). Specifically, by forming the second contact hole CH2 of the second interlayer insulating layer 14 to be larger than the second contact hole CH2 in the liquid crystal display device 200 of Embodiment 2, the cell gap dt of the transmission region Tr becomes larger than the cell gap dr of the reflection region Rf.

In this manner, in the liquid crystal display device 500 of the present embodiment, since the contact portion CP is formed from the transparent conductive material, a region in which the contact portion CP is provided is usable for display in the transmissive mode (i.e., the region can suitably function as the transmission region Tr). Accordingly, it is possible to further increase the transmittance compared with the liquid crystal display device 200 of Embodiment 2.

In the present embodiment, since the cell gap dt of the transmission region Tr is larger than the cell gap dr of the reflection region Rf, a difference between retardation of the liquid crystal layer 30 for the light used for display in the transmissive mode and retardation of the liquid crystal layer 30 for the light used for display in the reflective mode is able to be reduced, and voltage-luminance characteristics that are suitable for both the transmission region Tr and the reflection region Rf (that ensure brighter display) are able to be obtained.

Here, the results of verifying the effect of the present embodiment will be described. The effect is verified by manufacturing the liquid crystal display device 500 of the present embodiment (Example 5) and comparing the liquid crystal display device 500 with the liquid crystal display device in Example 2.

Table 7 indicates the reflectance and the transmittance in Examples 2 and 5. The reflectance and the transmittance indicate relative values obtained when the reflectance and the transmittance of Example 2 are expressed as 1.0. Table 7 also indicates the results when the liquid crystal display device 500 of Example 5 is manufactured such that the reflectance of Example 5 is the same as the reflectance of Example 2.

TABLE 7

|  | Example 2 | Example 5 |
|---|---|---|
| Reflectance | 1.00 | 1.00 |
| Transmittance | 1.00 | 3.24 |

As can be seen from Table 7, in Example 5, the transmittance greatly increases compared with Example 2 while the reflectance which is the same as that in Example 2 is kept. Such an effect is obtained when the region in which the contact portion CP is provided functions as the transmission region Tr and the cell gap dt of the transmission region Tr is larger than the cell gap dr of the reflective region Rf.

Table 8 indicates the results when the liquid crystal display device 500 of Example 5 is manufactured such that the reflectance is maximum while the area of the transmission region Tr of Example 5 is minimized (i.e., the area substantially matches the area of the contact portion CP).

TABLE 8

|  | Example 2 | Example 5 |
|---|---|---|
| Reflectance | 1.00 | 1.29 |
| Transmittance | 1.00 | 1.24 |

As can be seen from Table 8, in Example 5, it is possible to make the transmittance higher than that in Example 2 even when the area of the transmission region Tr is minimum. Additionally, it is possible to increase the area of the reflection region Rf, thus increasing the reflectance.

Embodiment 6

Figure 15:
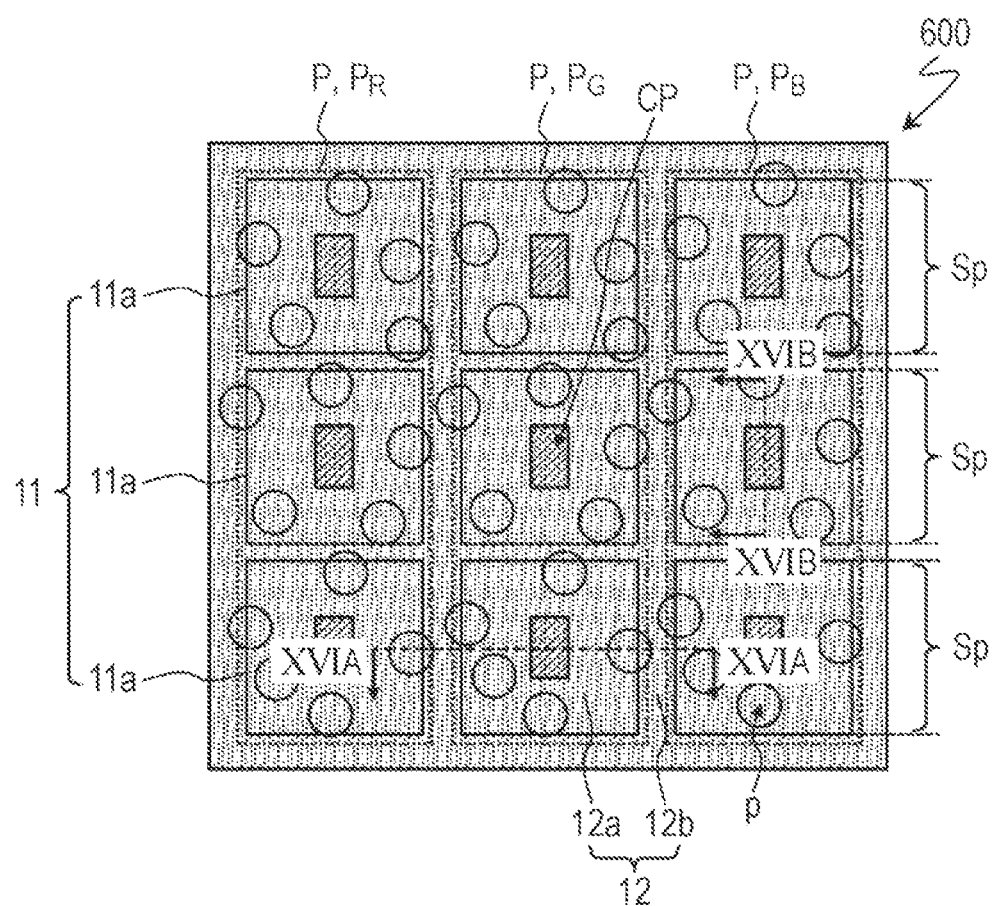
FIG. 15 is a plan view schematically illustrating still another liquid crystal display device 600 according to an embodiment of the disclosure and illustrates regions corresponding to three pixels P of the liquid crystal display device 600.
Figure 16A:
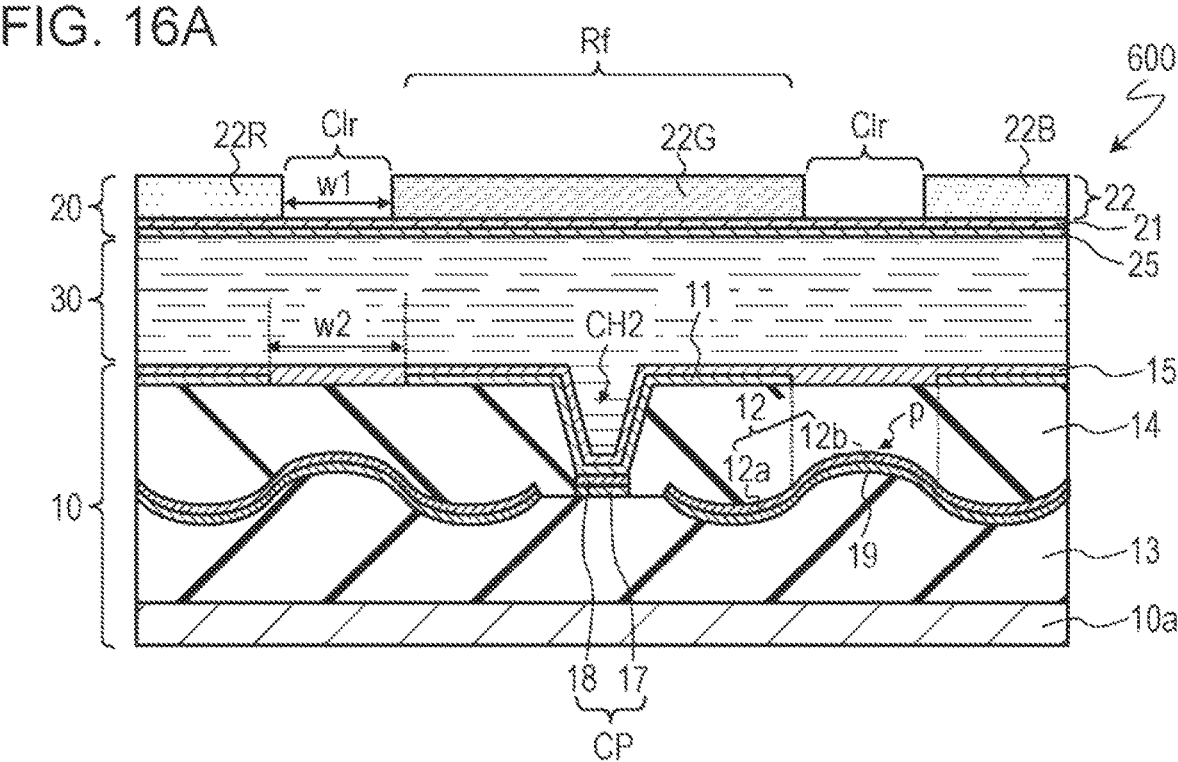
FIG. 16A is a sectional view schematically illustrating the liquid crystal display device 600 and illustrates a sectional structure along line XVIA-XVIA in FIG. 15.
Figure 16B:
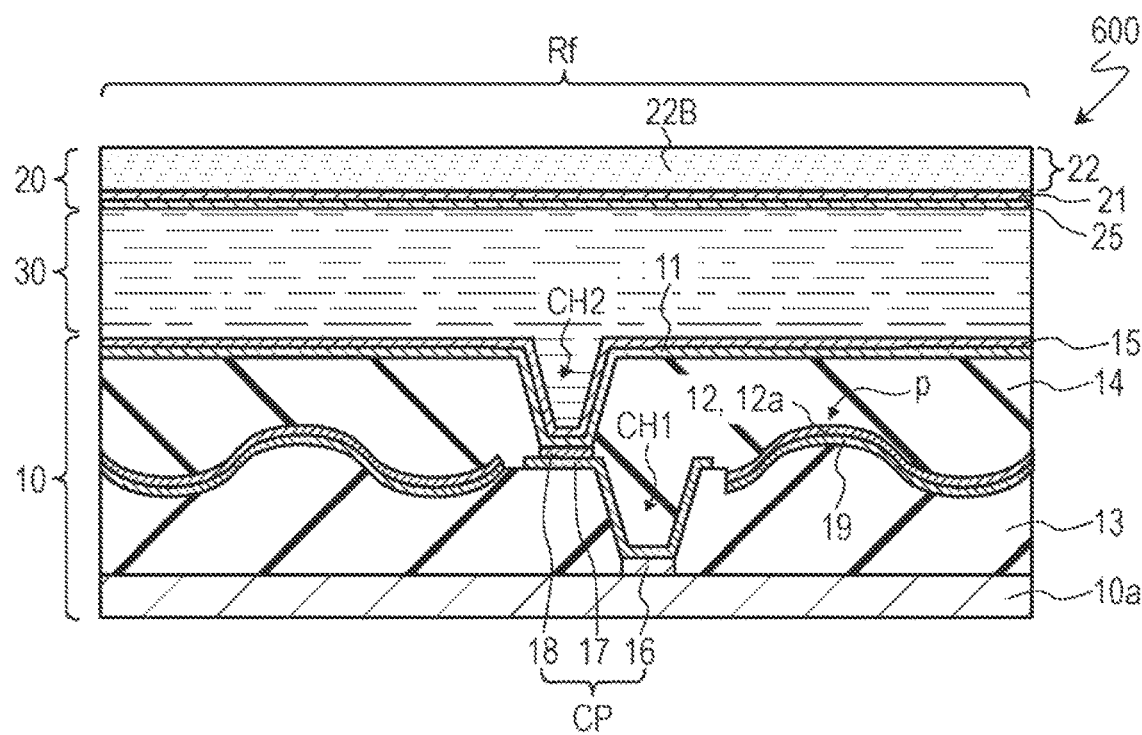
FIG. 16B is a sectional view schematically illustrating the liquid crystal display device 600 and illustrates a sectional structure along line XVIB-XVIB in FIG. 15.

A liquid crystal display device 600 of the present embodiment will be described with reference to FIGS. 15, 16A, and 16B. The liquid crystal display device 600 of the present embodiment is a reflection type liquid crystal display device. FIG. 15 is a plan view schematically illustrating the liquid crystal display device 600 and illustrates regions corresponding to three pixels P of the liquid crystal display device 600. FIGS. 16A and 16B are sectional views schematically illustrating the liquid crystal display device 600 and illustrate sectional structures along line XVIA-XVIA and line XVIB-XVIB in FIG. 15, respectively. Note that illustration of the substrate 20a is omitted in FIGS. 16A and 16B. The following description focuses on a difference between the liquid crystal display device 600 of the present embodiment and the liquid crystal display device 100 of Embodiment 1.

The opposing substrate 20 of the liquid crystal display device 600 has a color filter layer 22 that includes a red color filter (first color filter) 22R for transmitting first color light (here, red light), a green color filter (second color filter) 22G for transmitting second color light (here, green light), and a blue color filter (third color filter) 22B for transmitting third color light (here, blue light). In the present embodiment, as illustrated in FIG. 16A, the opposing substrate 20 has a colorless region Clr that has none of the red color filter 22R, the green color filter 22G, and the blue color filter 22B. As viewed in the direction normal to a display surface, the colorless region Cir overlaps at least a portion of the second region 12b of the reflection layer 12. In the illustrated example, the red color filter 22R, the green color filter 22G, and the blue color filter 22B form a stripe shape that extends in the column direction, and the colorless region Clr is positioned between any two pixels that are adjacent to each other in the row direction among the plurality of pixels. In addition, as viewed in the direction normal to the display surface, the colorless region Cir does not overlap the pixel electrode 11.

A color filter and a black matrix that are arranged so as to overlap the second region 12b of the reflection layer cause a reduction in the reflectance. The opposing substrate 20 including the colorless region Clr overlapping at least a portion of the second region 12b of the reflection layer 12 as in the present embodiment is able to increase the reflectance. Further, the colorless region Clr being arranged so as not to overlap the pixel electrode 11 is able to suppress a reduction in color purity during monochrome display.

The results of manufacturing the liquid crystal display device 600 of the present embodiment (Example 6) and verifying the improvement effect of the reflectance and a color reproduction range (NTSC ratio) will be described. The screen size of the manufactured liquid crystal display device 600 is 1.2 inches and the size of one pixel P is 126 µm in height and 42 µm in width. Of the first alignment film 15 of the TFT substrate 10 and the second alignment film 25 of the opposing substrate 20, only the second alignment film 25 is subjected to rubbing treatment. Thus, of the first alignment film 15 and the second alignment film 25, only the second alignment film 25 defines the pre-tilt azimuth. The dimension (cell gap) of the liquid crystal layer 30 is 3 µm, and a chiral agent is added to the liquid crystal material of the liquid crystal layer 30 such that the twist angle is 70° when a white voltage is applied (i.e., in a state where the liquid crystal molecules are horizontally aligned). The field-reversal driving (system (C)) is adopted as the driving system. A width w1 of the colorless region Clr in the row direction is 2.0 µm and a width w2 between pixel electrodes 11 adjacent in the row direction is 2.5 µm.

Figure 17:
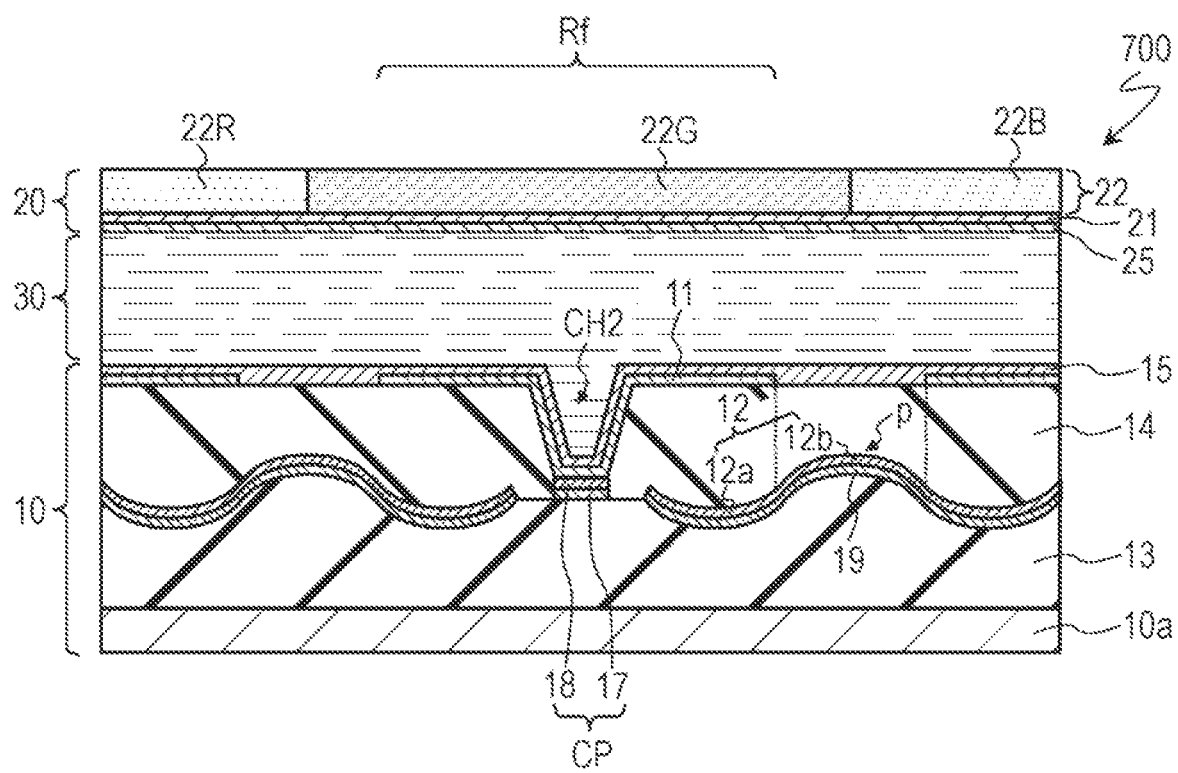
FIG. 17 is a sectional view illustrating a liquid crystal display device 700 of Example 7.

In addition to Example 6, a liquid crystal display device 700 of Example 7 illustrated in FIG. 17 is additionally manufactured and compared with the liquid crystal display device in Example 6. The liquid crystal display device 700 of Example 7 is the same as that in Example 6 in configuration except that the opposing substrate 20 does not have the colorless region Clr.

Table 9 indicates the reflectance and the NTSC ratio (relative ratio) obtained in Examples 6 and 7.

TABLE 9

|  | Example 6 | Example 7 |
|---|---|---|
| Reflectance | 1.04 | 1.00 |
| NTSC ratio (relative ratio) | 1.00 | 1.00 |

As can be seen from Table 9, in Example 6, the reflectance increases compared with Example 7. It can also be seen from Table 9 that the color reproduction range equivalent to that in Example 7 is obtained in Example 6. In this manner, it is confirmed that it is possible to increase the reflectance by providing the colorless region Cir and the reduction in color purity during monochrome display is able to be suppressed by the colorless region Clr not overlapping the pixel electrode 11. Note that although description has been given by taking the reflection type liquid crystal display device as an example, a transflective type liquid crystal display device is also able to achieve a similar effect.

Embodiment 7

Figure 18:
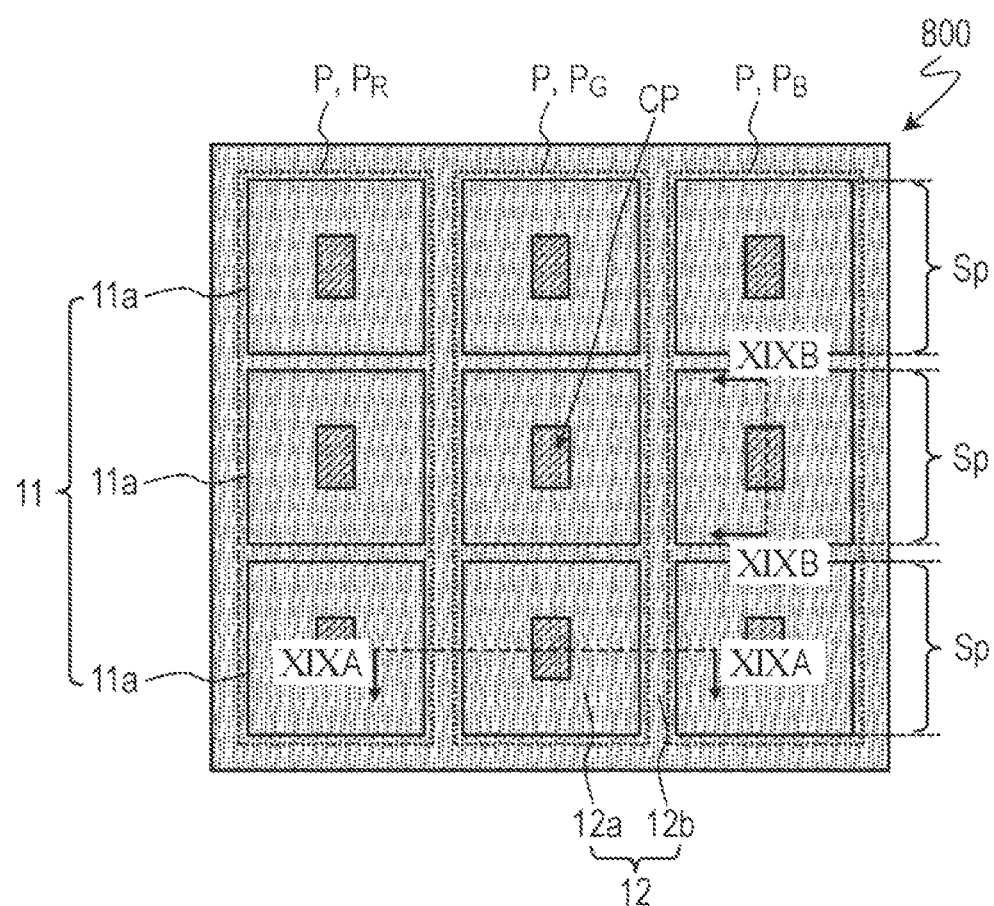
FIG. 18 is a plan view schematically illustrating still another liquid crystal display device 800 according to an embodiment of the disclosure and illustrates regions corresponding to three pixels P of the liquid crystal display device 800.
Figure 19A:
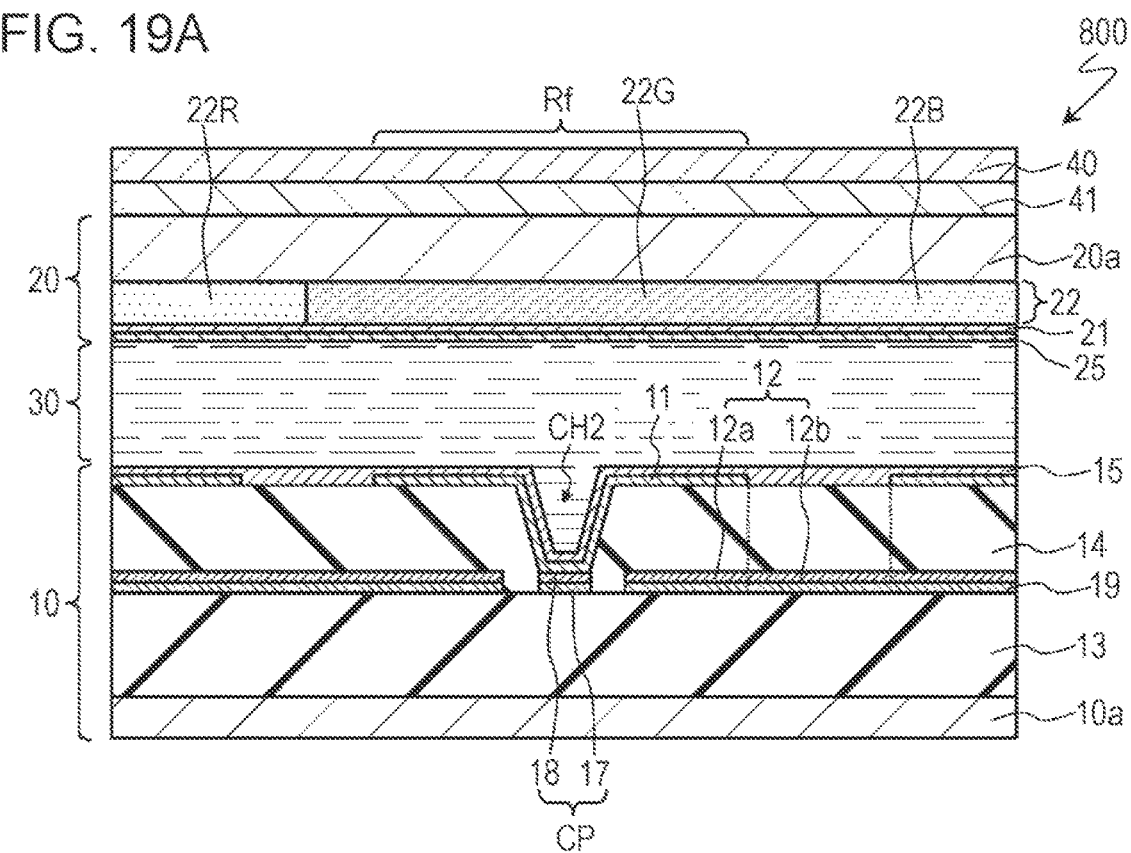
FIG. 19A is a sectional view schematically illustrating the liquid crystal display device 800 and illustrates a sectional structure along line XIXA-XIXA in FIG. 18.
Figure 19B:
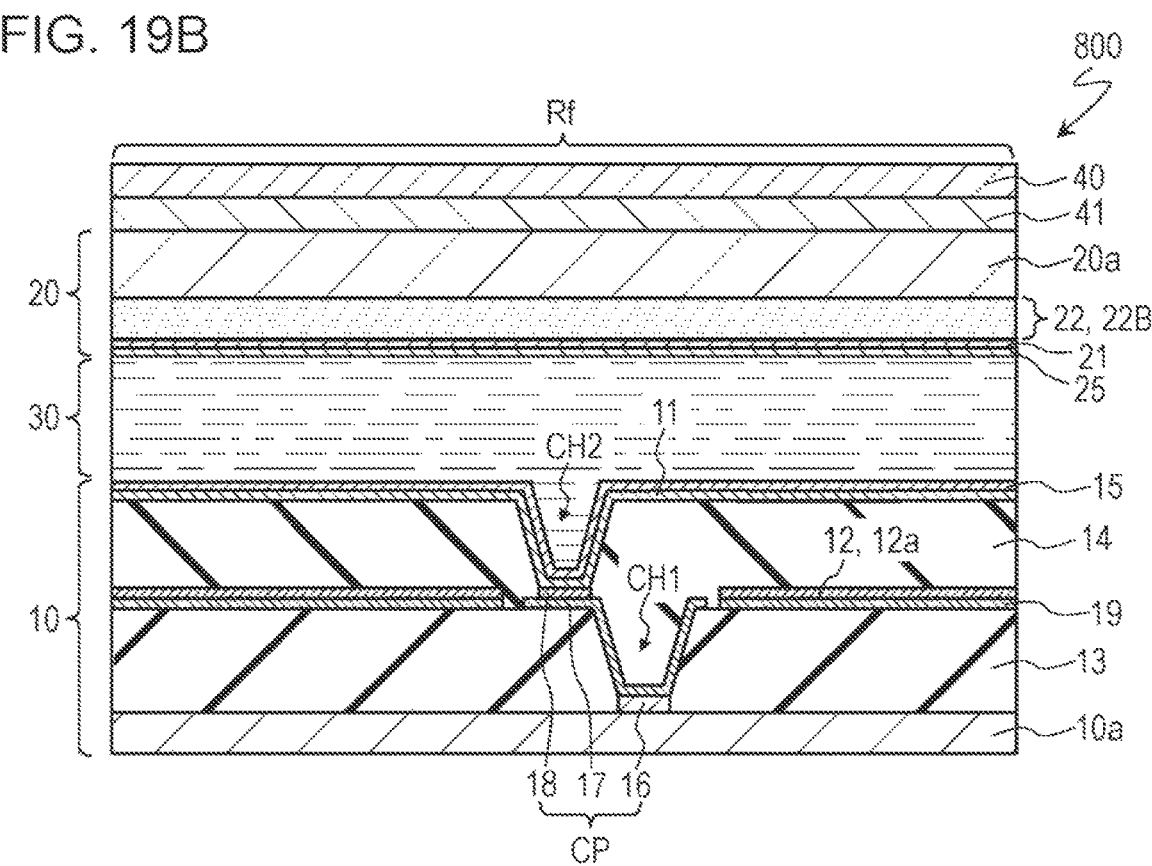
FIG. 19B is a sectional view schematically illustrating the liquid crystal display device 800 and illustrates a sectional structure along line XIXB-XIXB in FIG. 18.

A liquid crystal display device 800 of the present embodiment will be described with reference to FIGS. 18, 19A, and 19B. The liquid crystal display device 800 of the present embodiment is a reflection type liquid crystal display device. FIG. 18 is a plan view schematically illustrating the liquid crystal display device 800 and illustrates regions corresponding to three pixels P of the liquid crystal display device 800. FIGS. 19A and 19B are sectional views schematically illustrating the liquid crystal display device 800 and illustrate sectional structures along line XIXA-XIXA and line XIXB-XIXB in FIG. 18, respectively. The following description focuses on a difference between the liquid crystal display device 800 of the present embodiment and the liquid crystal display device 100 of Embodiment 1.

The reflection layer 12 of the liquid crystal display device 800 is formed on the first interlayer insulating layer 13 that does not have an uneven shape (i.e., that is flat). Therefore, the reflection layer 12 does not have an uneven surface structure and functions as a specular reflection layer.

The liquid crystal display device 800 further includes a circular polarizing plate 40 arranged on the observer side of the opposing substrate 20 and a light-scattering layer 41 arranged on the observer side with respect to the liquid crystal layer 30. The light-scattering layer 41 is, for example, an anisotropic light-scattering film. In the illustrated example, the light-scattering layer 41 is arranged between the substrate 20a and the circular polarizing plate 40.

In the present embodiment, light being scattered by the light-scattering layer 41 is able to achieve display close to paper-white display.

Embodiment 8

Figure 20:
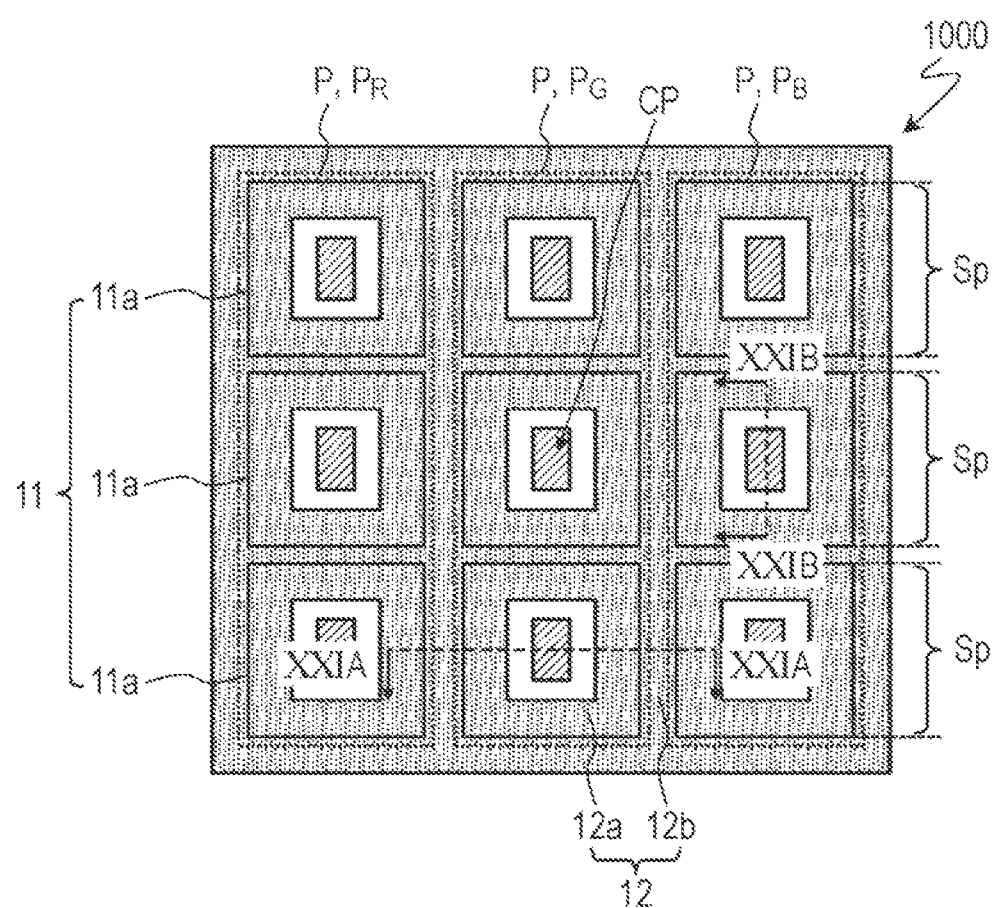
FIG. 20 is a plan view schematically illustrating still another liquid crystal display device 1000 according to an embodiment of the disclosure and illustrates regions corresponding to three pixels P of the liquid crystal display device 1000.
Figure 21A:
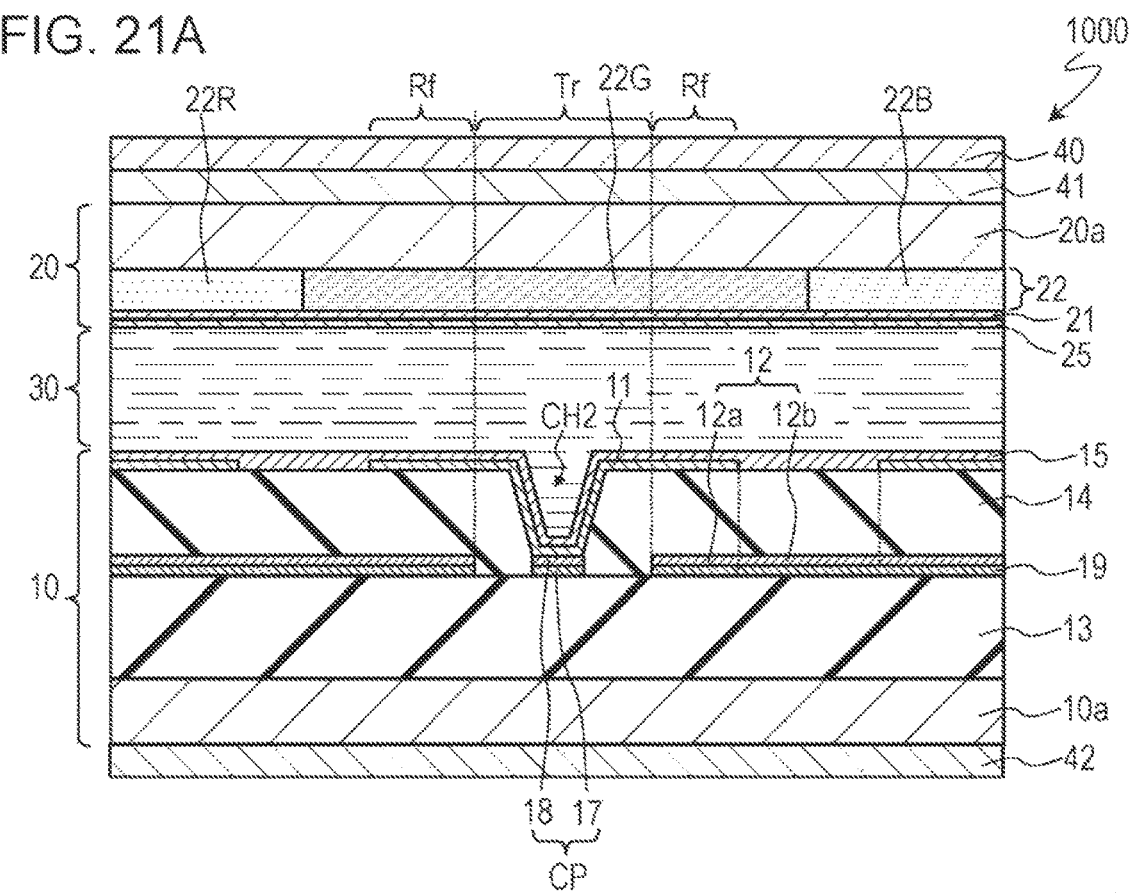
FIG. 21A is a sectional view schematically illustrating the liquid crystal display device 1000 and illustrates a sectional structure along line XXIA-XXIA in FIG. 20.
Figure 21B:
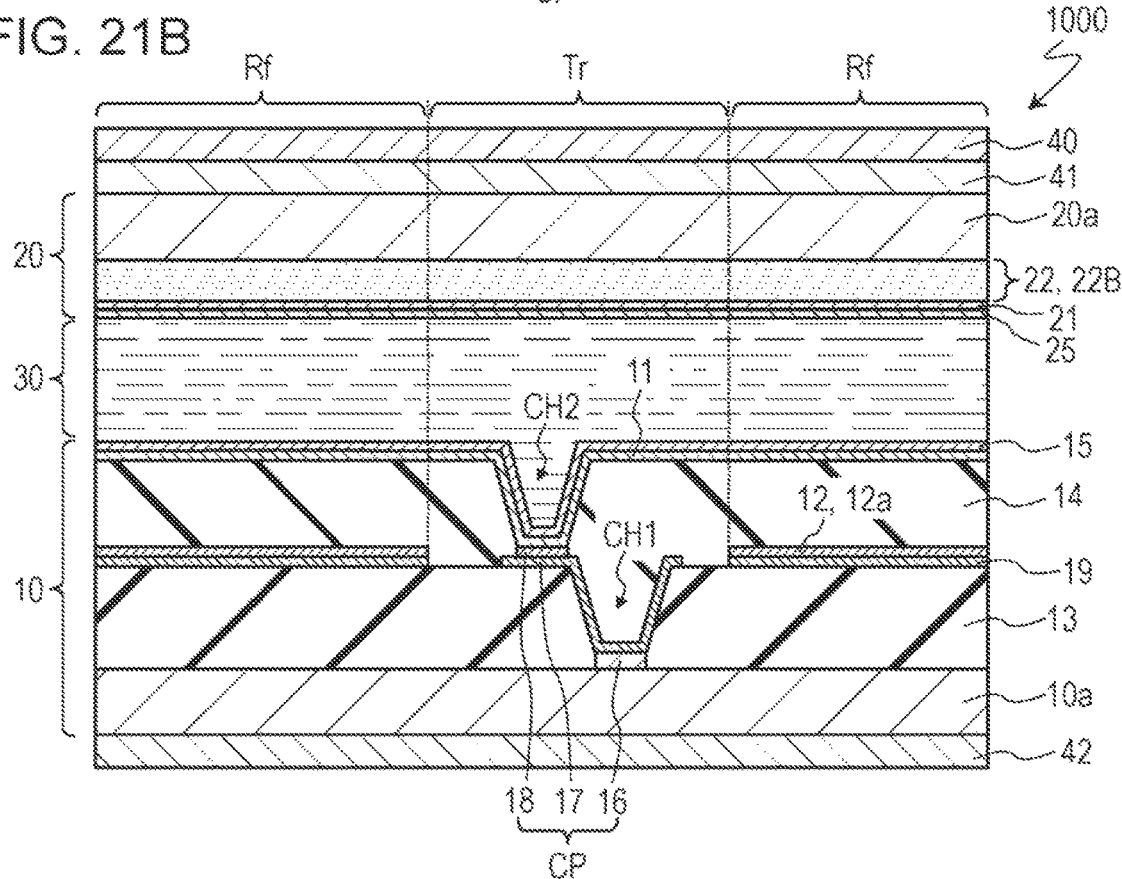
FIG. 21B is a sectional view schematically illustrating the liquid crystal display device 1000 and illustrates a sectional structure along line XXIB-XXIB in FIG. 20.

A liquid crystal display device 1000 of the present embodiment will be described with reference to FIGS. 20, 21A, and 21B. The liquid crystal display device 1000 of the present embodiment is a transflective type liquid crystal display device. FIG. 20 is a plan view schematically illustrating the liquid crystal display device 1000 and illustrates regions corresponding to three pixels P of the liquid crystal display device 1000. FIGS. 21A and 21B are sectional views schematically illustrating the liquid crystal display device 1000 and illustrate sectional structures along line XXIA-XXIA and line XXIB-XXIB in FIG. 20, respectively. The following description focuses on a difference between the liquid crystal display device 1000 of the present embodiment and the liquid crystal display device 800 of Embodiment 7.

The liquid crystal display device 1000 of the present embodiment differs from the liquid crystal display device 800 of Embodiment 7 in that each of the plurality of pixels P has, in addition to the reflection region Rf, the transmission region Tr for performing display in the transmissive mode. A portion of the pixel electrode 11 is positioned in the transmission region Tr. In the illustrated example, the transmission region Tr is positioned in the center of the pixel P. The liquid crystal display device 1000 includes an additional circular polarizing plate 42 arranged on the rear surface side of the TFT substrate 10.

Also in the liquid crystal display device 1000 of the present embodiment, although the reflection layer 12 does not have an uneven surface structure, light being scattered by the light-scattering layer 41 is able to achieve display close to paper-white display.

(Arrangement of Light-Scattering Layer)

Although FIGS. 19A, 19B, 21A, and 21B illustrate the light-scattering layer (anisotropic light-scattering film) 41 being arranged between the substrate 20a and the circular polarizing plate 40 as an example, the arrangement of the light-scattering layer 41 is not limited to the example.

Figure 22A:
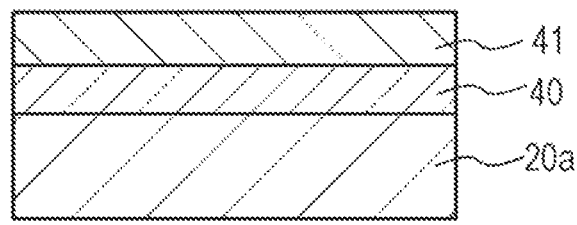
FIG. 22A illustrates another example of arrangement of a light-scattering layer 41.

FIG. 22A illustrates another example of the arrangement of the light-scattering layer 41. In the example illustrated in FIG. 22A, the light-scattering layer 41 is arranged on the observer side of the circular polarizing plate 40.

Figure 22B:
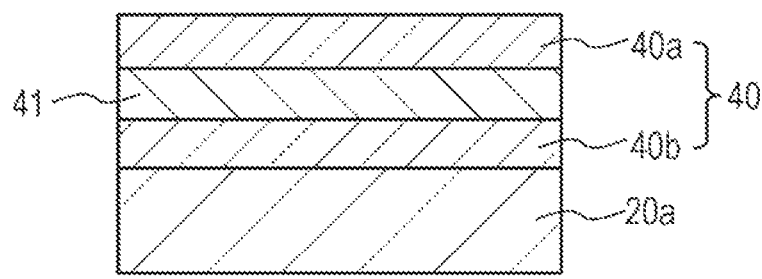
FIG. 22B illustrates still another example of arrangement of the light-scattering layer 41.

FIG. 22B illustrates still another example of the arrangement of the light-scattering layer 41. In the example illustrated in FIG. 22B, the circular polarizing plate 40 is constituted by a linear polarizing plate 40a and a phase difference layer 40b that is provided on the rear surface side of the linear polarizing plate 40a, and the light-scattering layer 41 is arranged between the linear polarizing plate 40a and the phase difference layer 40b. Note that two or more phase difference layers 40b may be provided.

Figure 22C:
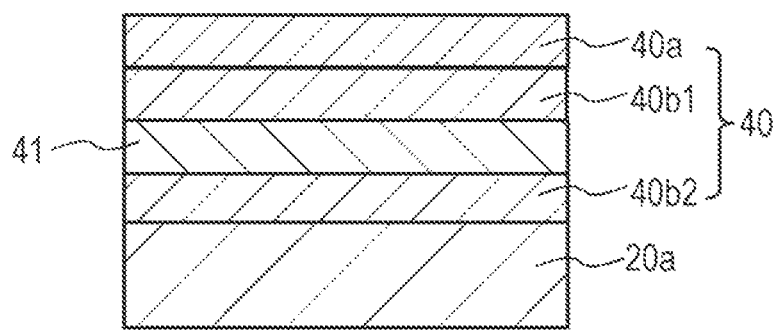
FIG. 22C illustrates still another example of arrangement of the light-scattering layer 41.

FIG. 22C illustrates still another example of the arrangement of the light-scattering layer 41. In the example illustrated in FIG. 22C, the circular polarizing plate 40 is a broadband circular polarizing plate constituted by the linear polarizing plate 40a, a λ/2 plate 40b1 provided on the rear surface side of the linear polarizing plate 40a, and a λ/4 plate 40b2 provided on the rear surface side of the λ/2 plate 40b1, and the light-scattering layer 41 is arranged between the λ/2 plate 40b1 and the λ/4 plate 40b2. Note that two λ/2 plates 40b1 may be provided.

Embodiment 9

Figure 23:
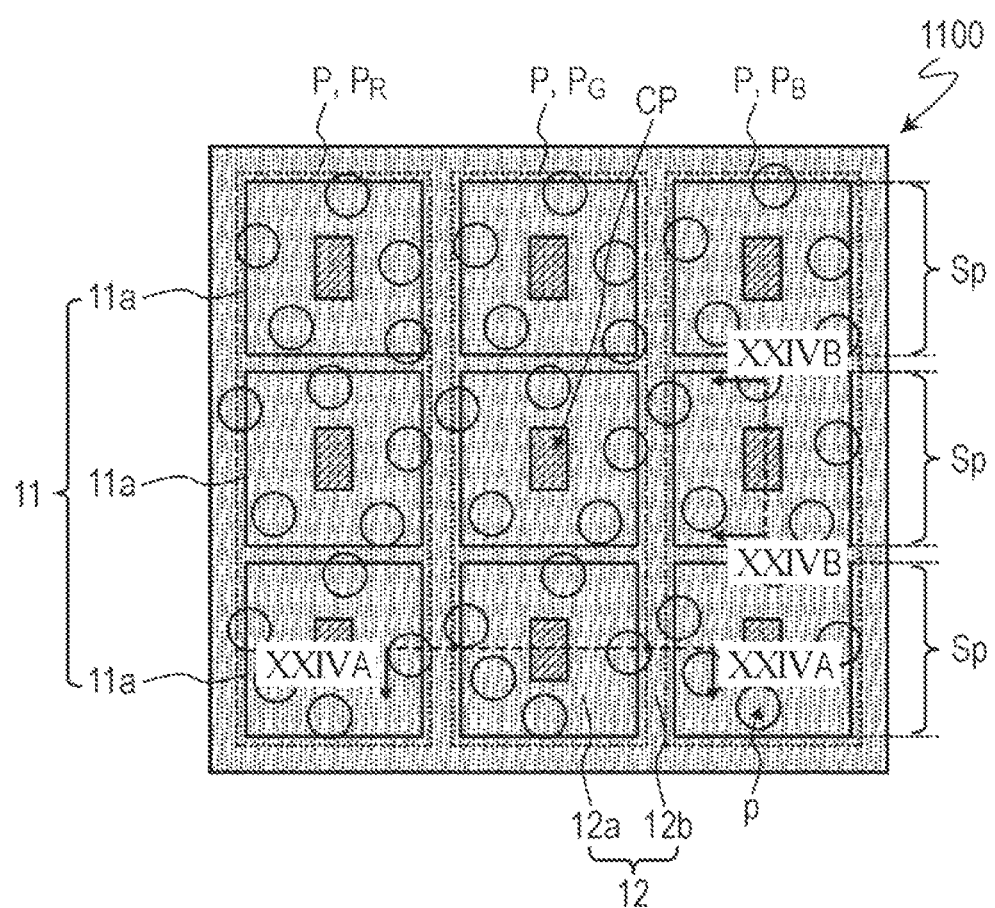
FIG. 23 is a plan view schematically illustrating still another liquid crystal display device 1100 according to an embodiment of the disclosure and illustrates regions corresponding to three pixels P of the liquid crystal display device 1100.
Figure 24A:
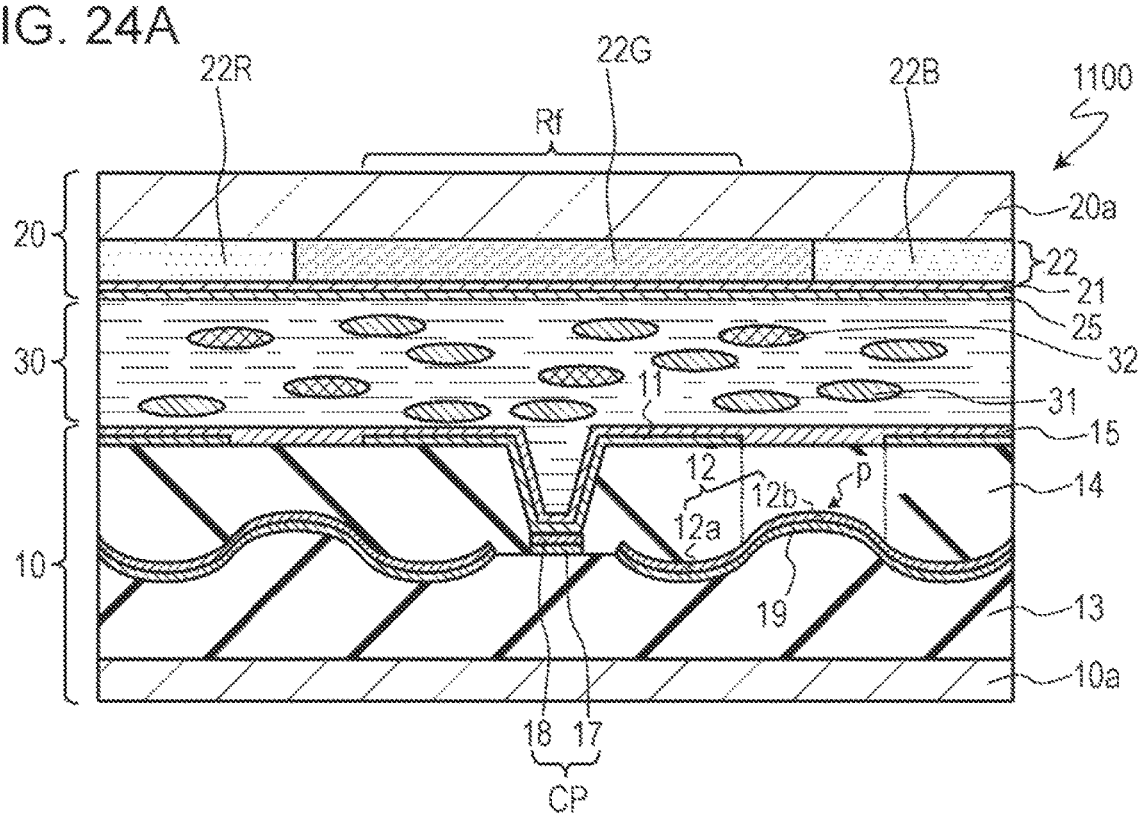
FIG. 24A is a sectional view schematically illustrating the liquid crystal display device 1100 and illustrates a sectional structure along line XXIVA-XXIVA in FIG. 23.
Figure 24B:
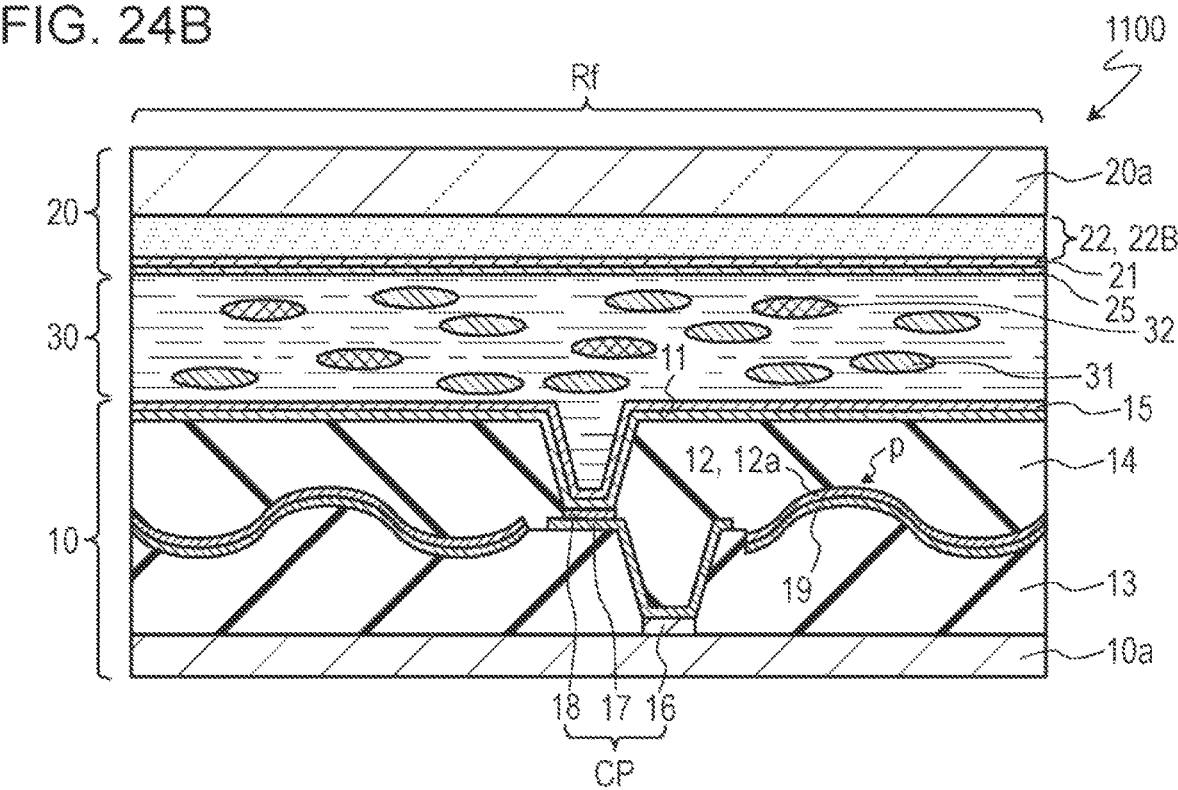
FIG. 24B is a sectional view schematically illustrating the liquid crystal display device 1100 and illustrates a sectional structure along line XXIVB-XXIVB in FIG. 23.

A liquid crystal display device 1100 of the present embodiment will be described with reference to FIGS. 23, 24A, and 24B. The liquid crystal display device 1100 of the present embodiment is a reflection type liquid crystal display device. FIG. 23 is a plan view schematically illustrating the liquid crystal display device 1100 and illustrates regions corresponding to three pixels P of the liquid crystal display device 1100. FIGS. 24A and 24B are sectional views schematically illustrating the liquid crystal display device 1100 and illustrate sectional structures along line XXIVA-XXIVA and line XXIVB-XXIVB in FIG. 23, respectively. The following description focuses on a difference between the liquid crystal display device 1100 of the present embodiment and the liquid crystal display device 100 of Embodiment 1.

The liquid crystal layer 30 of the liquid crystal display device 1100 includes one type of a liquid crystal molecule 31 and a dichroic dye 32. That is, the liquid crystal display device 1100 is a so-called guest-host liquid crystal display device. The color of the dichroic dye is, for example, black. The amount of the dichroic dye added to the liquid crystal material is, for example, 3% by weight. When no voltage is applied to the liquid crystal layer 30, the liquid crystal molecule 31 and the dichroic dye 32 are horizontally aligned and black display is performed in such a state. When a given voltage is applied to the liquid crystal layer 30, the liquid crystal molecule 31 and the dichroic dye 32 are vertically aligned and white display is performed in such a state. A polarizing plate is not necessary in the guest-host liquid crystal display device 1100. Accordingly, display brightness is improved. Note that the second interlayer insulating layer 14 substantially has no phase difference.

Embodiment 10

Figure 25:
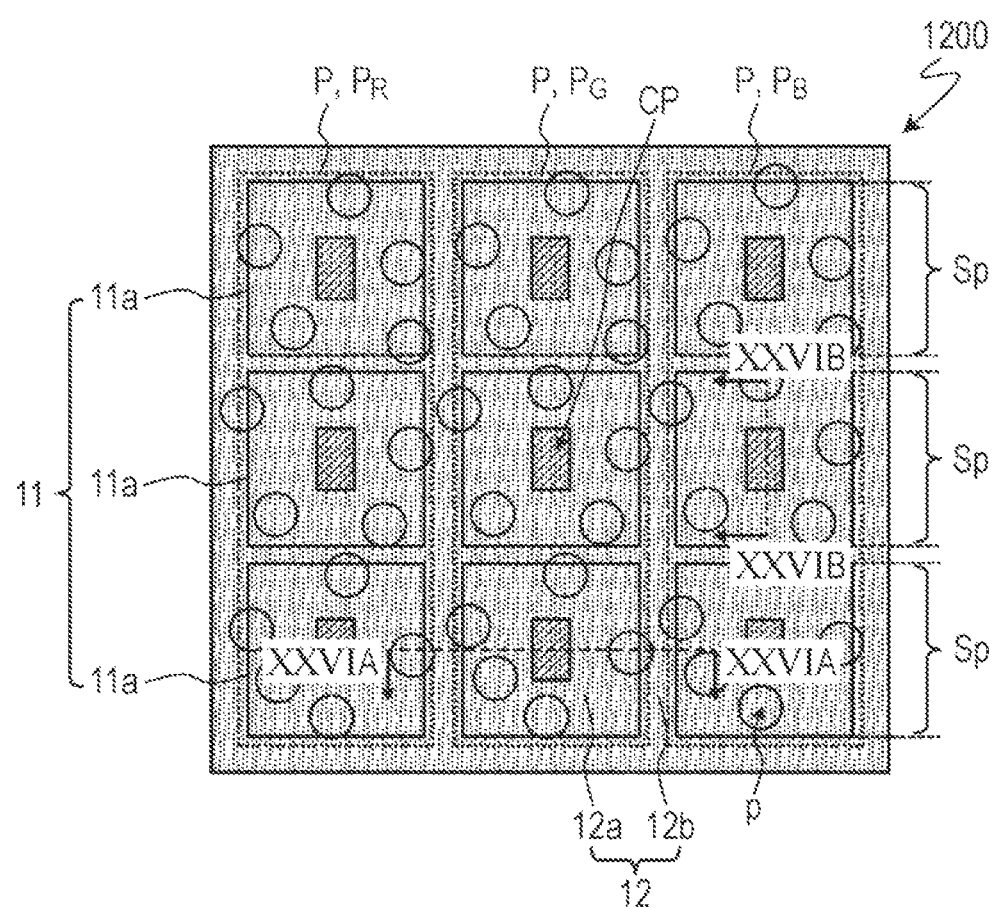
FIG. 25 is a plan view schematically illustrating still another liquid crystal display device 1200 according to an embodiment of the disclosure and illustrates regions corresponding to three pixels P of the liquid crystal display device 1200.
Figure 26A:
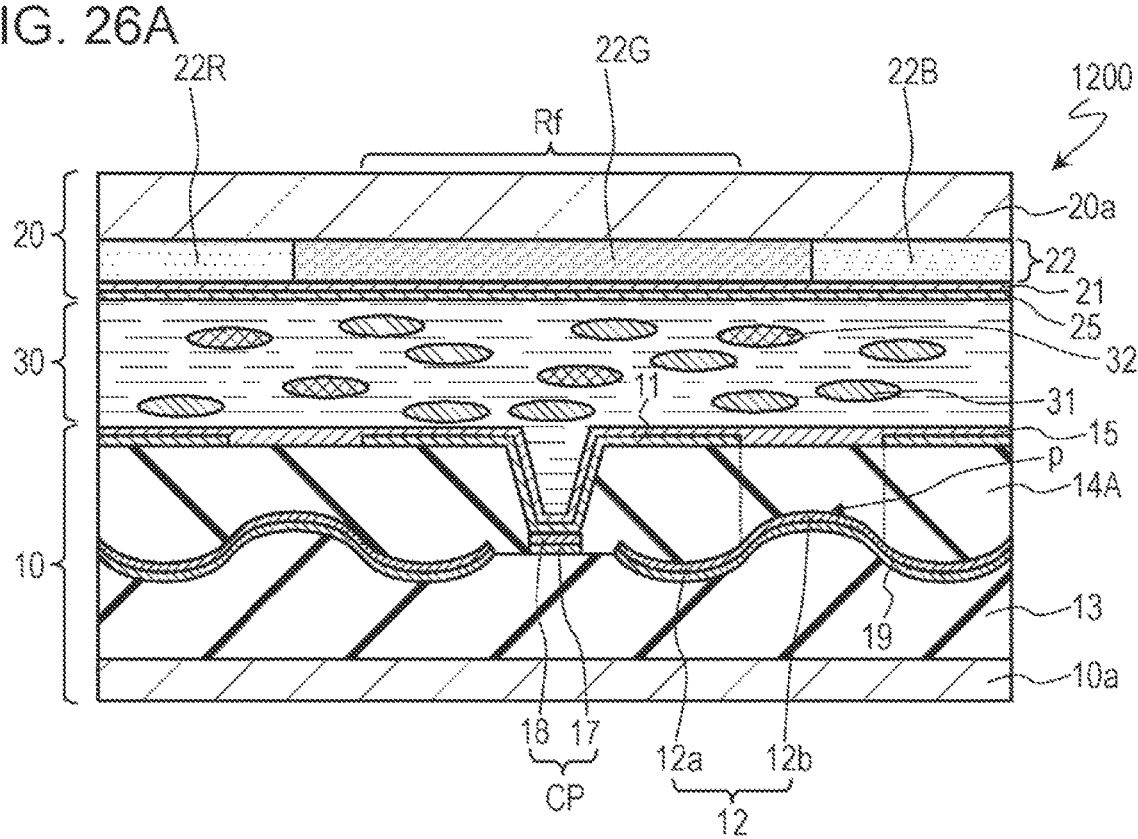
FIG. 26A is a sectional view schematically illustrating the liquid crystal display device 1200 and illustrates a sectional structure along line XXVIA-XXVIA in FIG. 25.
Figure 26B:
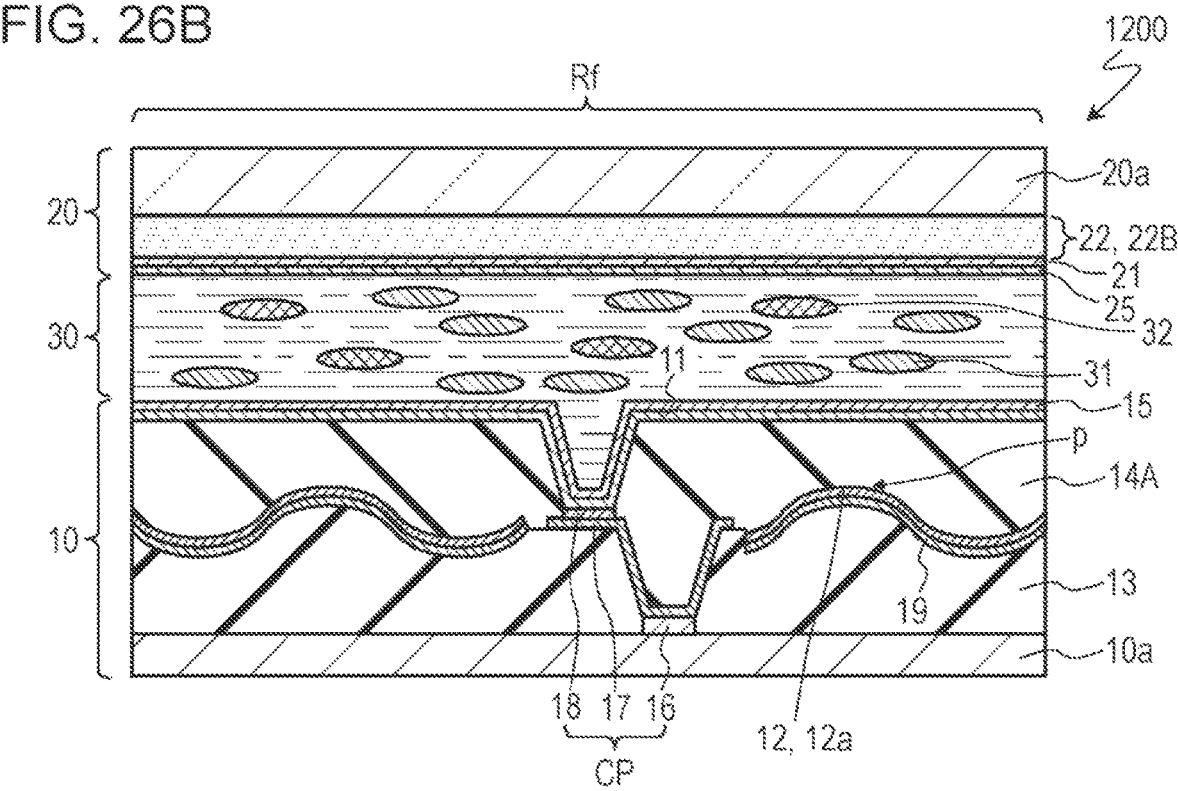
FIG. 26B is a sectional view schematically illustrating the liquid crystal display device 1200 and illustrates a sectional structure along line XXVIB-XXVIB in FIG. 25.

A liquid crystal display device 1200 of the present embodiment will be described with reference to FIGS. 25, 26A, and 26B. The liquid crystal display device 1200 of the present embodiment is a reflection type liquid crystal display device. FIG. 25 is a plan view schematically illustrating the liquid crystal display device 1200 and illustrates regions corresponding to three pixels P of the liquid crystal display device 1200. FIGS. 26A and 26B are sectional views schematically illustrating the liquid crystal display device 1200 and illustrate sectional structures along line XXVIA-XXVIA and line XXVIB-XXVIB in FIG. 25, respectively. The following description focuses on a difference between the liquid crystal display device 1200 of the present embodiment and the liquid crystal display device 1100 of Embodiment 9.

The liquid crystal display device 1200 of the present embodiment includes a phase difference layer (in-cell phase difference film) as a second interlayer insulating layer 14A that covers the reflection layer 12. The phase difference layer 14A specifically functions as a λ/4 plate. The slow axis of the phase difference layer 14A that functions as the λ/4 plate is arranged, for example, such that an angle formed by the slow axis and the extinction axis of the dichroic dye in the absence of voltage application is substantially 45°. When the phase difference layer 14A is provided, the contrast ratio is improved.

Embodiment 11

Figure 27:
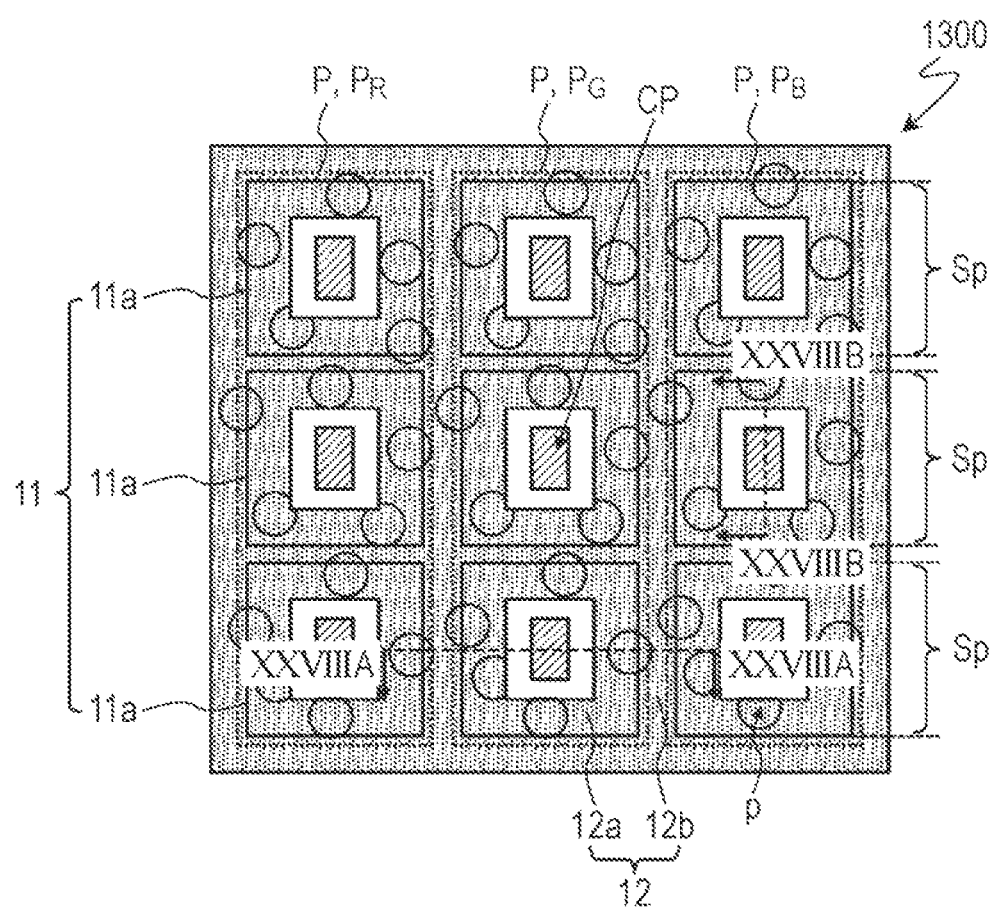
FIG. 27 is a plan view schematically illustrating still another liquid crystal display device 1300 according to an embodiment of the disclosure and illustrates regions corresponding to three pixels P of the liquid crystal display device 1300.
Figure 28A:
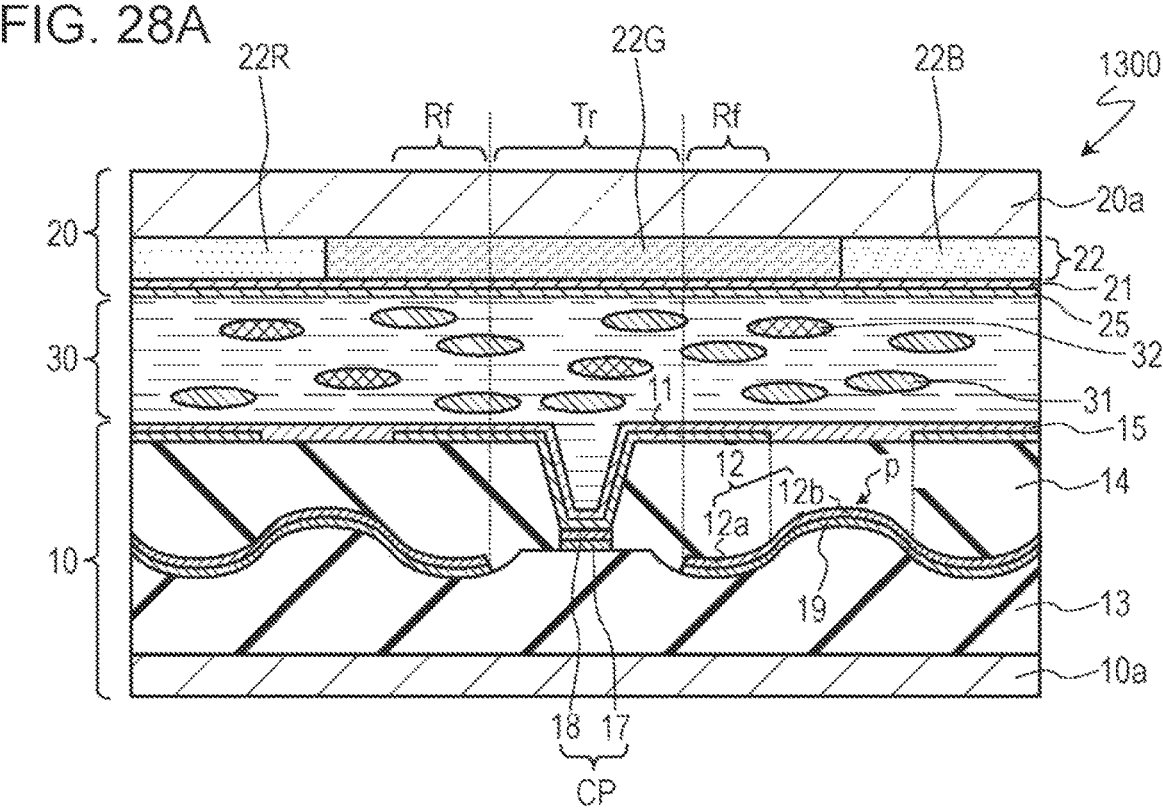
FIG. 28A is a sectional view schematically illustrating the liquid crystal display device 1300 and illustrates a sectional structure along line XXVIIIA-XXVIIIA in FIG. 27.
Figure 28B:
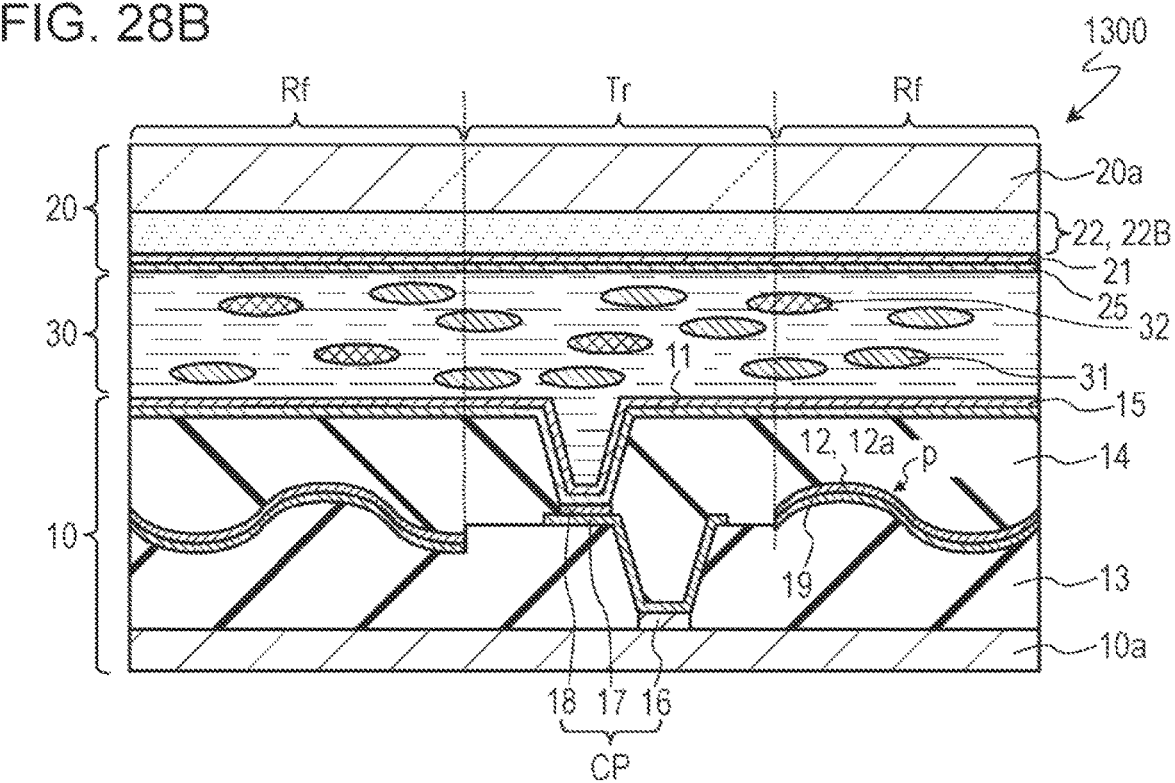
FIG. 28B is a sectional view schematically illustrating the liquid crystal display device 1300 and illustrates a sectional structure along line XXVIIIB-XXVIIB in FIG. 27.

A liquid crystal display device 1300 of the present embodiment will be described with reference to FIGS. 27, 28A, and 28B. The liquid crystal display device 1300 of the present embodiment is a transflective type liquid crystal display device. FIG. 27 is a plan view schematically illustrating the liquid crystal display device 1300 and illustrates regions corresponding to three pixels P of the liquid crystal display device 1300. FIGS. 28A and 28B are sectional views schematically illustrating the liquid crystal display device 1300 and illustrate sectional structures along line XXVIIIA-XXVIIIA and line XXVIIIB-XXVIIIB in FIG. 27, respectively. The following description focuses on a difference between the liquid crystal display device 1300 of the present embodiment and the liquid crystal display device 1200 of Embodiment 10.

The liquid crystal display device 1300 of the present embodiment differs from the liquid crystal display device 1200 of Embodiment 10 in that each of the plurality of pixels P has, in addition to the reflection region Rf, the transmission region Tr for performing display in the transmissive mode. A portion of the pixel electrode 11 is positioned in the transmission region Tr. In the illustrated example, the transmission region Tr is positioned in the center of the pixel P. Note that the second interlayer insulating layer 14 substantially has no phase difference.

The liquid crystal display device 1300 of the present embodiment is also a guest-host liquid crystal display device. It is not necessary to provide a polarizing plate on the observer side (front side) of the opposing substrate 20. No polarizing plate may be provided or a polarizing plate may be provided on the rear surface side (rear side) of the TFT substrate 10.

Embodiment 12

Figure 29:
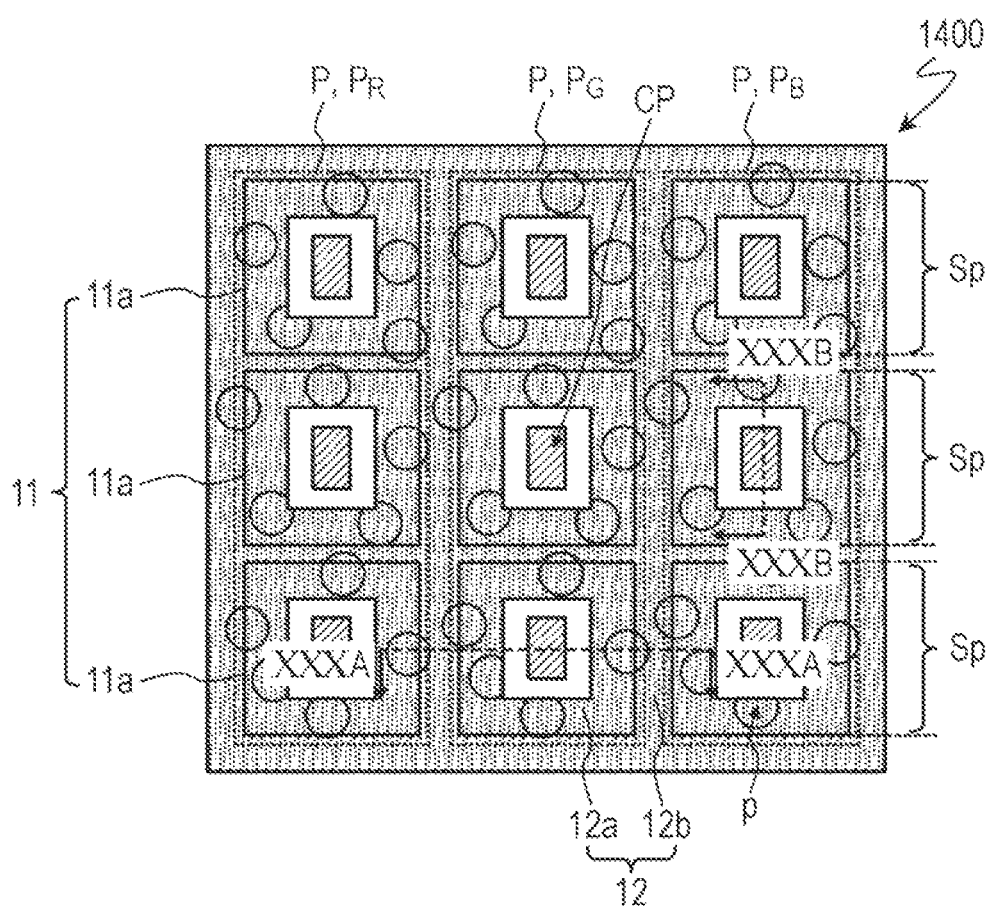
FIG. 29 is a plan view schematically illustrating still another liquid crystal display device 1400 according to an embodiment of the disclosure and illustrates regions corresponding to three pixels P of the liquid crystal display device 1400.
Figure 30A:
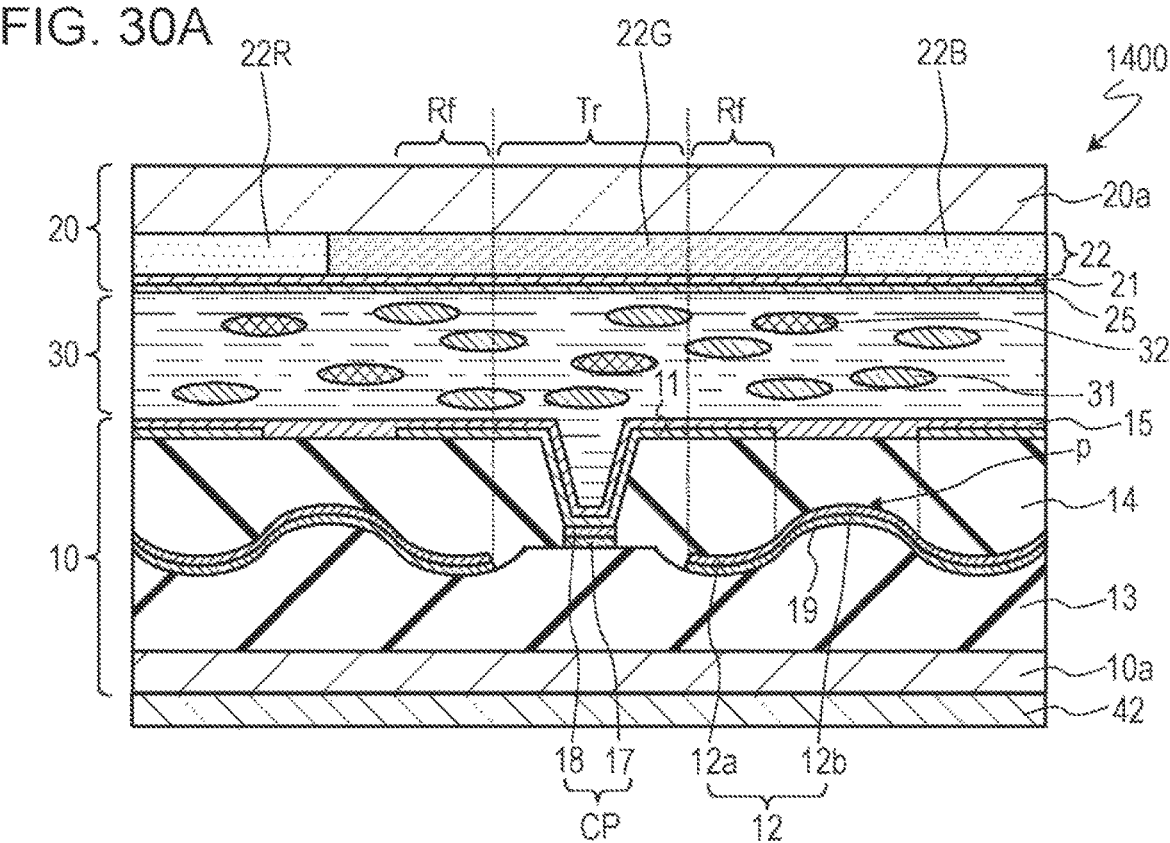
FIG. 30A is a sectional view schematically illustrating the liquid crystal display device 1400 and illustrates a sectional structure along line XXXA-XXXA in FIG. 29.
Figure 30B:
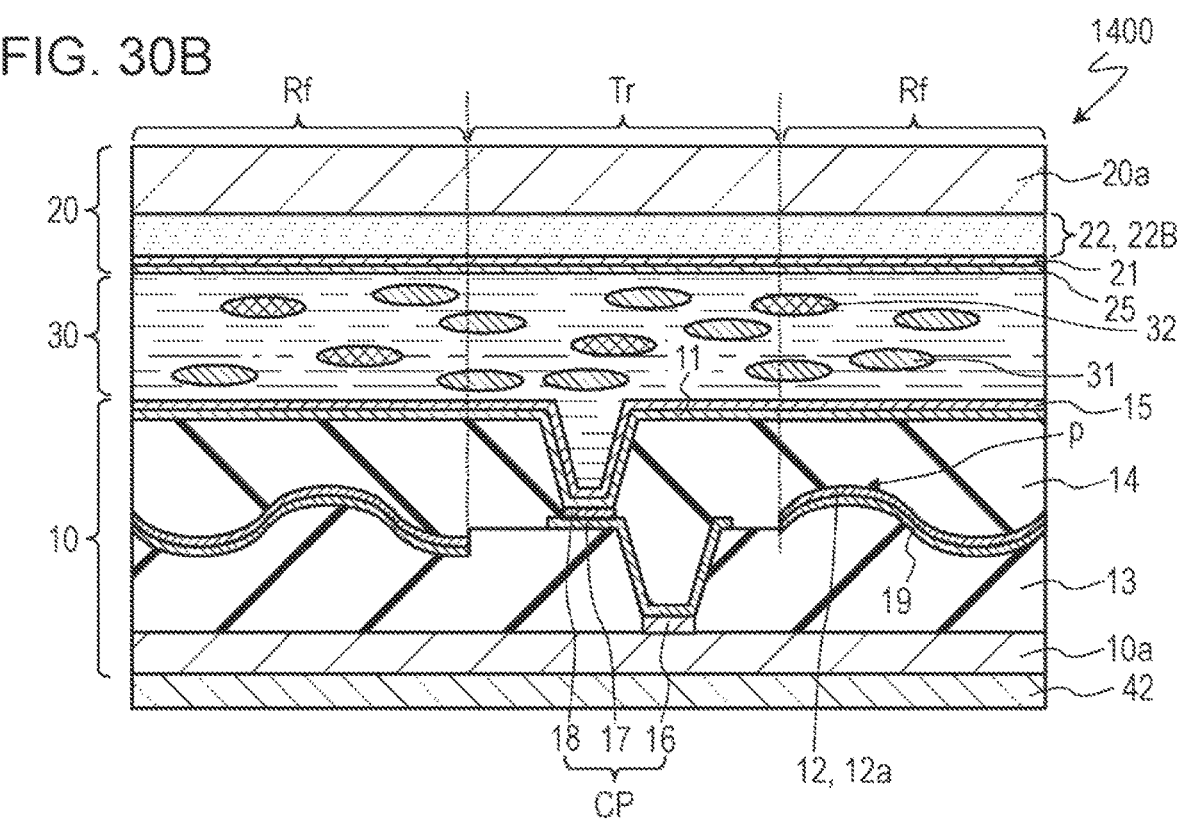
FIG. 30B is a sectional view schematically illustrating the liquid crystal display device 1400 and illustrates a sectional structure along line XXXB-XXXB in FIG. 29.

A liquid crystal display device 1400 of the present embodiment will be described with reference to FIGS. 29, 30A, and 30B. The liquid crystal display device 1400 of the present embodiment is a transflective type liquid crystal display device. FIG. 29 is a plan view schematically illustrating the liquid crystal display device 1400 and illustrates regions corresponding to three pixels P of the liquid crystal display device 1400. FIGS. 30A and 30B are sectional views schematically illustrating the liquid crystal display device 1400 and illustrate sectional structures along line XXXA-XXXA and line XXXB-XXXB in FIG. 29, respectively. The following description focuses on a difference between the liquid crystal display device 1400 of the present embodiment and the liquid crystal display device 1300 of Embodiment 11.

The liquid crystal display device 1400 of the present embodiment includes a phase difference layer (in-cell phase difference film) as the second interlayer insulating layer 14A that covers the reflection layer 12. The liquid crystal display device 1400 also includes the circular polarizing plate 42 provided on the rear surface side of the TFT substrate 10. The phase difference layer 14A specifically functions as the λ/4 plate. When the phase difference layer 14A is provided, the contrast ratio is improved.

An embodiment of the disclosure is widely applicable to a liquid crystal display device (that is, a reflection type liquid crystal display device or transflective type liquid crystal display device) in which each pixel has a reflection region for performing display in a reflective mode.

The present disclosure contains subject matter related to that disclosed in Japanese Priority Patent Application JP 2019-225483 filed in the Japan Patent Office on Dec. 13, 2019 and Japanese Priority Patent Application JP 2020-156311 filed in the Japan Patent Office on Sep. 17, 2020, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal display device comprising:
a first substrate;
a second substrate facing the first substrate;
a liquid crystal layer provided between the first substrate and the second substrate; and
a plurality of pixels that are arrayed in a matrix including a plurality of rows and a plurality of columns, wherein
each of the plurality of pixels has a reflection region for performing display in a reflective mode,
the first substrate includes a pixel electrode provided in each of the plurality of pixels and a reflection layer positioned opposite to the liquid crystal layer with respect to the pixel electrode,
the reflection layer has a first region positioned in each of the plurality of pixels and a second region positioned between any two pixels adjacent to each other among the plurality of pixels, and
voltages of an identical polarity are applied to the liquid crystal layer for any two pixels adjacent to each other in a row direction among the plurality of pixels, for any two pixels adjacent to each other in a column direction among the plurality of pixels, or for all the plurality of pixels, and
the liquid crystal display device does not have a black matrix between any two pixels adjacent to each other among the plurality of pixels.

2. A liquid crystal display device comprising:
a first substrate;
a second substrate facing the first substrate;
a liquid crystal layer provided between the first substrate and the second substrate; and
a plurality of pixels that are arrayed in a matrix including a plurality of rows and a plurality of columns, wherein each of the plurality of pixels has a reflection region for performing display in a reflective mode, the first substrate includes a pixel electrode provided in each of the plurality of pixels and a reflection layer positioned opposite to the liquid crystal layer with respect to the pixel electrode, the reflection layer has a first region positioned in each of the plurality of pixels and a second region positioned between any two pixels adjacent to each other among the plurality of pixels, and voltages of an identical polarity are applied to the liquid crystal layer for any two pixels adjacent to each other in a row direction among the plurality of pixels, for any two pixels adjacent to each other in a column direction among the plurality of pixels, or for all the plurality of pixels, wherein the first substrate further includes a transparent insulating layer provided so as to cover the reflection layer, and the pixel electrode is formed from a transparent conductive material and arranged on the transparent insulating layer, wherein each of the plurality of pixels further has a transmission region for performing display in a transmissive mode, and a portion of the pixel electrode is positioned in the transmission region.

3. The liquid crystal display device according to claim 2, wherein
a dimension of the liquid crystal layer in the transmission region is greater than a dimension of the liquid crystal layer in the reflection region.

4. The liquid crystal display device according to claim 2, wherein
the first substrate includes a backplane circuit electrically connected to the pixel electrode and an additional transparent insulating layer provided so as to cover the backplane circuit,
the reflection layer is arranged on the additional transparent insulating layer,
the additional transparent insulating layer has a first contact hole formed in the transmission region,
the transparent insulating layer has a second contact hole formed in the transmission region,
the first substrate further includes a contact portion that electrically connects the pixel electrode and the backplane circuit in the first contact hole and the second contact hole, and
the contact portion is formed from a transparent conductive material.

5. The liquid crystal display device according to claim 2, wherein
the first substrate includes a first alignment film provided so as to be in contact with the liquid crystal layer,
the second substrate includes a second alignment film provided so as to be in contact with the liquid crystal layer, and
at least one of the first alignment film and the second alignment film defines a pre-tilt azimuth that differs between the transmission region and the reflection region.

6. The liquid crystal display device according to claim 5, wherein at least one of the first alignment film and the second alignment film is subjected to light-alignment treatment.

7. The liquid crystal display device according to claim 2, wherein
the second substrate includes a counter electrode provided so as to face the pixel electrode, and
the counter electrode is formed from a transparent conductive material.

8. The liquid crystal display device according to claim 1, further comprising a memory circuit connected to each of the plurality of pixels.

9. The liquid crystal display device according to claim 1, wherein
the voltages of the identical polarity are applied to the liquid crystal layer for all the plurality of pixels.

10. The liquid crystal display device according to claim 1, wherein
the second substrate has a color filter layer that includes a first color filter for transmitting first color light, a second color filter for transmitting second color light, and a third color filter for transmitting third color light,
the second substrate has a colorless region that includes none of the first color filter, the second color filter, and the third color filter, and
as viewed in a direction normal to a display surface, the colorless region overlaps at least a portion of the second region of the reflection layer.

11. The liquid crystal display device according to claim 10, wherein
as viewed in the direction normal to the display surface, the colorless region does not overlap the pixel electrode.

12. A liquid crystal display device comprising:
a first substrate;
a second substrate facing the first substrate;
a liquid crystal layer provided between the first substrate and the second substrate; and
a plurality of pixels that are arrayed in a matrix including a plurality of rows and a plurality of columns, wherein
each of the plurality of pixels has a reflection region for performing display in a reflective mode,
the first substrate includes a pixel electrode provided in each of the plurality of pixels and a reflection layer positioned opposite to the liquid crystal layer with respect to the pixel electrode,
the reflection layer has a first region positioned in each of the plurality of pixels and a second region positioned between any two pixels adjacent to each other among the plurality of pixels, and
voltages of an identical polarity are applied to the liquid crystal layer for any two pixels adjacent to each other in a row direction among the plurality of pixels, for any two pixels adjacent to each other in a column direction among the plurality of pixels, or for all the plurality of pixels,
wherein the first region and the second region of the reflection layer each have an uneven surface structure.

13. The liquid crystal display device according to claim 1, further comprising a light-scattering layer arranged on an observer side with respect to the liquid crystal layer.

14. The liquid crystal display device according to claim 1, wherein
the liquid crystal layer includes a liquid crystal molecule and a dichroic dye.

* * * * *